US012756528B2

(12) United States Patent
Zheng et al.

(10) Patent No.: US 12,756,528 B2
(45) Date of Patent: Oct. 6, 2026

(54) ENHANCED PHYSICAL UPLINK CONTROL CHANNEL SPATIAL RELATION INFORMATION IN MAC CE

(71) Applicant: QUALCOMM Incorporated, San Diego, CA (US)

(72) Inventors: Ruiming Zheng, Beijing (CN); Yan Zhou, San Diego, CA (US); Linhai He, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 435 days.

(21) Appl. No.: 17/753,649

(22) PCT Filed: Aug. 31, 2020

(86) PCT No.: PCT/CN2020/112452
§ 371 (c)(1),
(2) Date: Mar. 10, 2022

(87) PCT Pub. No.: WO2021/073289
PCT Pub. Date: Apr. 22, 2021

(65) Prior Publication Data
US 2022/0337382 A1 Oct. 20, 2022

(30) Foreign Application Priority Data
Oct. 15, 2019 (WO) ................ PCT/CN2019/111187

(51) Int. Cl.
*H04W 72/21* (2023.01)
*H04L 5/00* (2006.01)
(Continued)

(52) U.S. Cl.
CPC ......... *H04L 5/0096* (2013.01); *H04W 52/325* (2013.01); *H04W 72/21* (2023.01); *H04W 52/146* (2013.01)

(58) Field of Classification Search
CPC ... H04L 5/0096; H04L 5/0048; H04L 5/0053; H04L 5/001; H04L 5/0085; H04L 5/0023;
(Continued)

(56) References Cited

U.S. PATENT DOCUMENTS

2020/0119778 A1* 4/2020 Grant .................. H04B 7/0695
2020/0358577 A1* 11/2020 Takeda ................. H04L 5/0023
(Continued)

FOREIGN PATENT DOCUMENTS

CN 110034876 A 7/2019
CN 110035504 A 7/2019
(Continued)

OTHER PUBLICATIONS

VIVO ( "Further discussion on Multi-Beam Operation" , 3GPP Draft; R1-1908167_Further Discussion on Multi-Beam Operation, Aug. 2019).*
(Continued)

*Primary Examiner* — Lakeram Jangbahadur
(74) *Attorney, Agent, or Firm* — Harrity & Harrity, LLP

(57) ABSTRACT

Various aspects of the present disclosure generally relate to wireless communication. In some aspects, a user equipment (UE) may receive a medium access control (MAC) command element (CE) indicating an update to a spatial relation configuration of the UE for physical uplink control channel (PUCCH) transmissions, the update indicated by PUCCH resource information. The UE may update the spatial relation configuration of the UE with the PUCCH resource
(Continued)

information. The UE may transmit a PUCCH transmission using the spatial relation configuration. Numerous other aspects are provided.

23 Claims, 18 Drawing Sheets

(51) Int. Cl.
*H04W 52/32* (2009.01)
*H04W 52/14* (2009.01)

(58) Field of Classification Search
CPC . H04W 52/325; H04W 72/21; H04W 52/146; H04W 72/046
See application file for complete search history.

(56) References Cited

U.S. PATENT DOCUMENTS

| | | | | |
|---|---|---|---|---|
| 2020/0389887 | A1* | 12/2020 | Zhou | H04W 72/23 |
| 2021/0058932 | A1* | 2/2021 | Takeda | H04W 80/02 |
| 2021/0105765 | A1* | 4/2021 | Cirik | H04B 7/0695 |

FOREIGN PATENT DOCUMENTS

| | | | |
|---|---|---|---|
| CN | 110535601 | A | 12/2019 |
| CN | 111278128 | A | 6/2020 |
| EP | 3776900 | B1 | 8/2021 |
| WO | WO-2019137426 | A1 | 7/2019 |
| WO | 2019171518 | A1 | 9/2019 |
| WO | WO-2019190377 | A1 | 10/2019 |

OTHER PUBLICATIONS

Intel (Discussion on multi-beam enhancements, R1-1908654, Aug. 2019).*

International Search Report and Written Opinion—PCT/CN2020/112452—ISA/EPO—Nov. 26, 2020.

International Search Report and Written Opinion—PCT/CN2019/111187—ISAEPO—Jul. 15, 2020.

LG Electronics: "Discussion on Multi-Beam based Operation and Enhancements", 3GPP Draft, 3GPP TSG RAN WG1 Meeting #97, R1-1906731 Multi-Beam_Final, 3rd Generation Partnership Project (3GPP), Mobile Competence Centre, 650, Route Des Lucioles, F-06921 Sophia-Antipolis Cedex, France, vol. RAN WG1, No. Reno, USA, May 13, 2019-May 17, 2019, May 4, 2019 (May 4, 2019), XP051708767, 13 Pages, Retrieved from the internet: URL: http://www.3gpp.org/ftp/tsg%5Fran/WG1%5FRL1/TSGR1%5F97/Docs/R1%2D1906731%2Ezip, [retrieved on May 4, 2019], Section 2.

Samsung: "New MAC CEs for NR MIMO," 3GPP TSG-RAN WG2 Meeting #101, Athens, Greece, Feb. 26-Mar. 2, 2018, R2-1802418, Feb. 14, 2018, section 2.3, 18 pages, The whole document.

Intel Corporation: "Discussion on Multi-Beam Enhancements", 3GPP Draft, 3GPP TSG RAN WG1 #98, R1-1908654, Discussion on Multi-Beam Enhancements, 3rd Generation Partnership Project (3GPP), Mobile Competence Centre, 650, Route Des Lucioles, F-06921, Sophia-Antipolis Cedex, France, vol. RAN WG1, No. Prague, CZ, Aug. 26, 2019-Aug. 30, 2019, Aug. 17, 2019, XP051765262, 16 Pages, paragraph [0004], figure 7, chapter 2.4 chapter 4 chapter 4.1 chapter 4.2, sections 2, 3.

Supplementary European Search Report—EP20876791—Search Authority—The Hague—Oct. 11, 2023.

VIVO: "Further Discussion on Multi-Beam Operation", 3GPP Draft, 3GPP TSG RAN WG1 #98, R1-1908167, 3rd Generation Partnership Project (3GPP), Mobile Competence Centre, 650, Route Des Lucioles, F-06921 Sophia-Antipolis Cedex, Fran, vol. RAN WG1, No. Prague, CZ, Aug. 26, 2019-Aug. 30, 2019, Aug. 17, 2019, XP051764786, 12 Pages, Paragraph [3.ULpanelspecifictransmission], sections 2-6.

* cited by examiner

MAC CE for 8 spatial relations

MAC CE including spatial relation IDs for multiple PUCCH resources

MAC CE including bitmaps for multiple PUCCH resources

MAC CEs indicating spatial relation information and PUCCH group ID on single octet MAC CE including spatial relation information for multiple PUCCH groups

ENHANCED PHYSICAL UPLINK CONTROL CHANNEL SPATIAL RELATION INFORMATION IN MAC CE

CROSS-REFERENCE TO RELATED APPLICATIONS

This Patent Application is a 371 national stage of PCT Application PCT/CN2020/112452 filed on Aug. 31, 2020, entitled "ENHANCED PHYSICAL UPLINK CONTROL CHANNEL SPATIAL RELATION INFORMATION IN MAC CE," which claims priority to Patent Cooperation Treaty (PCT) Application No. PCT/CN2019/111187, filed on Oct. 15, 2019, entitled "ENHANCED PHYSICAL UPLINK CONTROL CHANNEL SPATIAL RELATION-INFORMATION IN MAC CE," both of which are hereby expressly incorporated by reference herein.

FIELD OF THE DISCLOSURE

Aspects of the present disclosure generally relate to wireless communication and particularly to techniques and apparatuses for enhancing physical uplink control channel (PUCCH) spatial relation information in a medium access control (MAC) command element (CE) for updating a spatial relation configuration of a user equipment (UE) for PUCCH transmissions.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a user equipment (UE), may include receiving a medium access control (MAC) command element (CE) indicating an update to a spatial relation configuration of the UE for physical uplink control channel (PUCCH) transmissions, the update indicated by PUCCH resource information. The PUCCH resource information includes a PUCCH resource identifier that identifies a PUCCH resource, and the PUCCH resource information includes identification information that identifies a particular spatial relation configuration of spatial settings and power control parameters for transmission on the PUCCH resource. The method may include updating the spatial relation configuration of the UE with the PUCCH resource information and transmitting a PUCCH transmission using the spatial relation configuration.

In some aspects, a method of wireless communication, performed by a UE, may include receiving a MAC CE indicating an update to a spatial relation configuration of the UE for PUCCH transmissions, the update indicated by group PUCCH resource information. The group PUCCH resource information identifies a plurality of PUCCH resources, and the group PUCCH resource information includes a particular spatial relation configuration of spatial settings and power control parameters for transmission on the plurality of PUCCH resources, the particular spatial relation configuration being applicable to each PUCCH resource of the plurality of PUCCH resources. The method may include updating the spatial relation configuration of the UE with the group PUCCH resource information and transmitting a PUCCH transmission using the spatial relation configuration.

In some aspects, a method of wireless communication, performed by a base station, may include generating a MAC CE indicating an update to a spatial relation configuration of a UE for PUCCH transmissions, the update indicated by PUCCH resource information. The PUCCH resource information includes a PUCCH resource identifier that identifies a PUCCH resource, and the PUCCH resource information includes identification information that identifies a particular spatial relation configuration of spatial settings and power control parameters for transmission on the PUCCH resource. The method may include transmitting the MAC CE to the UE to update the spatial relation configuration of the UE for PUCCH transmissions.

In some aspects, a method of wireless communication, performed by a base station, may include generating a MAC CE indicating an update to a spatial relation configuration of a UE for PUCCH transmissions, the update indicated by group PUCCH resource information. The group PUCCH resource information identifies a plurality of PUCCH resources, and the group PUCCH resource information includes a particular spatial relation configuration of spatial settings and power control parameters for transmission on the plurality of PUCCH resources, the particular spatial relation configuration being applicable to each PUCCH resource of the plurality of PUCCH resources. The method may include transmitting the MAC CE to the UE to update the spatial relation configuration of the UE for PUCCH transmissions.

In some aspects, a UE for wireless communication may include memory and one or more processors operatively coupled to the memory. The memory and the one or more processors may be configured to receive a MAC CE indicating an update to a spatial relation configuration of the UE for PUCCH transmissions, the update indicated by PUCCH resource information. The PUCCH resource information includes a PUCCH resource identifier that identifies a PUCCH resource, and the PUCCH resource information includes identification information that identifies a particular spatial relation configuration of spatial settings and power control parameters for transmission on the PUCCH resource. The memory and the one or more processors may be configured to update the spatial relation configuration of the UE with the PUCCH resource information and transmit a PUCCH transmission using the spatial relation configuration.

In some aspects, a UE for wireless communication may include memory and one or more processors operatively coupled to the memory. The memory and the one or more processors may be configured to receive a MAC CE indicating an update to a spatial relation configuration of the UE for PUCCH transmissions, the update indicated by group PUCCH resource information. The group PUCCH resource information identifies a plurality of PUCCH resources, and the group PUCCH resource information includes a particular spatial relation configuration of spatial settings and power control parameters for transmission on the plurality of PUCCH resources, the particular spatial relation configuration being applicable to each PUCCH resource of the plurality of PUCCH resources. The memory and the one or more processors may be configured to update the spatial relation configuration of the UE with the group PUCCH resource information and transmit a PUCCH transmission using the spatial relation configuration.

In some aspects, a base station for wireless communication may include memory and one or more processors operatively coupled to the memory. The memory and the one or more processors may be configured to generate a MAC CE indicating an update to a spatial relation configuration of a UE for PUCCH transmissions, the update indicated by PUCCH resource information. The PUCCH resource information includes a PUCCH resource identifier that identifies a PUCCH resource, and the PUCCH resource information includes identification information that identifies a particular spatial relation configuration of spatial settings and power control parameters for transmission on the PUCCH resource. The memory and the one or more processors may be configured to transmit the MAC CE to the UE to update the spatial relation configuration of the UE for PUCCH transmissions.

In some aspects, a base station for wireless communication may include memory and one or more processors operatively coupled to the memory. The memory and the one or more processors may be configured to generate a MAC CE indicating an update to a spatial relation configuration of a UE for PUCCH transmissions, the update indicated by group PUCCH resource information. The group PUCCH resource information identifies a plurality of PUCCH resources, and the group PUCCH resource information includes a particular spatial relation configuration of spatial settings and power control parameters for transmission on the plurality of PUCCH resources, the particular spatial relation configuration being applicable to each PUCCH resource of the plurality of PUCCH resources. The memory and the one or more processors may be configured to transmit the MAC CE to the UE to update the spatial relation configuration of the UE for PUCCH transmissions.

In some aspects, a non-transitory computer-readable medium may store one or more instructions for wireless communication. The one or more instructions, when executed by one or more processors of a UE, may cause the one or more processors to receive a MAC CE indicating an update to a spatial relation configuration of the UE for PUCCH transmissions, the update indicated by PUCCH resource information. The PUCCH resource information includes a PUCCH resource identifier that identifies a PUCCH resource, and the PUCCH resource information includes identification information that identifies a particular spatial relation configuration of spatial settings and power control parameters for transmission on the PUCCH resource. The one or more instructions, when executed by the one or more processors of the UE, may cause the one or more processors to update the spatial relation configuration of the UE with the PUCCH resource information and transmit a PUCCH transmission using the spatial relation configuration.

In some aspects, a non-transitory computer-readable medium may store one or more instructions for wireless communication. The one or more instructions, when executed by one or more processors of a UE, may cause the one or more processors to receive a MAC CE indicating an update to a spatial relation configuration of the UE for PUCCH transmissions, the update indicated by group PUCCH resource information. The group PUCCH resource information identifies a plurality of PUCCH resources, and the group PUCCH resource information includes a particular spatial relation configuration of spatial settings and power control parameters for transmission on the plurality of PUCCH resources, the particular spatial relation configuration being applicable to each PUCCH resource of the plurality of PUCCH resources. The one or more instructions, when executed by the one or more processors of the UE, may cause the one or more processors to update the spatial relation configuration of the UE with the group PUCCH resource information and transmit a PUCCH transmission using the spatial relation configuration.

In some aspects, a non-transitory computer-readable medium may store one or more instructions for wireless communication. The one or more instructions, when executed by one or more processors of a base station, may cause the one or more processors to generate a MAC CE indicating an update to a spatial relation configuration of a UE for PUCCH transmissions, the update indicated by PUCCH resource information. The PUCCH resource information includes a PUCCH resource identifier that identifies a PUCCH resource, and the PUCCH resource information includes identification information that identifies a particular spatial relation configuration of spatial settings and power control parameters for transmission on the PUCCH resource. The one or more instructions, when executed by the one or more processors of the base station, may cause the one or more processors to transmit the MAC CE to the UE to update the spatial relation configuration of the UE for PUCCH transmissions.

In some aspects, a non-transitory computer-readable medium may store one or more instructions for wireless communication. The one or more instructions, when executed by one or more processors of a base station, may cause the one or more processors to: generate a MAC CE indicating an update to a spatial relation configuration of a UE for PUCCH transmissions, the update indicated by group PUCCH resource information. The group PUCCH resource information identifies a plurality of PUCCH resources, and the group PUCCH resource information includes a particular spatial relation configuration of spatial settings and power control parameters for transmission on the plurality of PUCCH resources, the particular spatial relation configuration being applicable to each PUCCH resource of the plurality of PUCCH resources. The one or more instructions, when executed by the one or more processors of the base station, may cause the one or more processors to transmit the MAC CE to the UE to update the spatial relation configuration of the UE for PUCCH transmissions.

In some aspects, an apparatus for wireless communication may include means for receiving a MAC CE indicating an update to a spatial relation configuration of the apparatus for PUCCH transmissions, the update indicated by PUCCH resource information. The PUCCH resource information includes a PUCCH resource identifier that identifies a PUCCH resource, and the PUCCH resource information includes identification information that identifies a particular spatial relation configuration of spatial settings and power control parameters for transmission on the PUCCH resource. The apparatus may include means for updating the spatial relation configuration of the apparatus with the PUCCH resource information and means for transmitting a PUCCH transmission using the spatial relation configuration.

In some aspects, an apparatus for wireless communication may include means for receiving a MAC CE indicating an update to a spatial relation configuration of the apparatus for PUCCH transmissions, the update indicated by group PUCCH resource information. The group PUCCH resource information identifies a plurality of PUCCH resources, and the group PUCCH resource information includes a particular spatial relation configuration of spatial settings and power control parameters for transmission on the plurality of PUCCH resources, the particular spatial relation configuration being applicable to each PUCCH resource of the plurality of PUCCH resources. The apparatus may include means for updating the spatial relation configuration of the apparatus with the group PUCCH resource information and means for transmitting a PUCCH transmission using the spatial relation configuration.

In some aspects, an apparatus for wireless communication may include means for generating a MAC CE indicating an update to a spatial relation configuration of a UE for PUCCH transmissions, the update indicated by PUCCH resource information. The PUCCH resource information includes a PUCCH resource identifier that identifies a PUCCH resource, and the PUCCH resource information includes identification information that identifies a particular spatial relation configuration of spatial settings and power control parameters for transmission on the PUCCH resource. The apparatus may include means for transmitting the MAC CE to the UE to update the spatial relation configuration of the UE for PUCCH transmissions.

In some aspects, an apparatus for wireless communication may include means for generating a MAC CE indicating an update to a spatial relation configuration of a UE for PUCCH transmissions, the update indicated by group PUCCH resource information. The group PUCCH resource information identifies a plurality of PUCCH resources, and the group PUCCH resource information includes a particular spatial relation configuration of spatial settings and power control parameters for transmission on the plurality of PUCCH resources, the particular spatial relation configuration being applicable to each PUCCH resource of the plurality of PUCCH resources. The apparatus may include means for transmitting the MAC CE to the UE to update the spatial relation configuration of the UE for PUCCH transmissions.

Aspects generally include a method, apparatus, system, computer program product, non-transitory computer-readable medium, user equipment, base station, wireless communication device, and/or processing system as substantially described herein with reference to and as illustrated by the accompanying drawings, and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
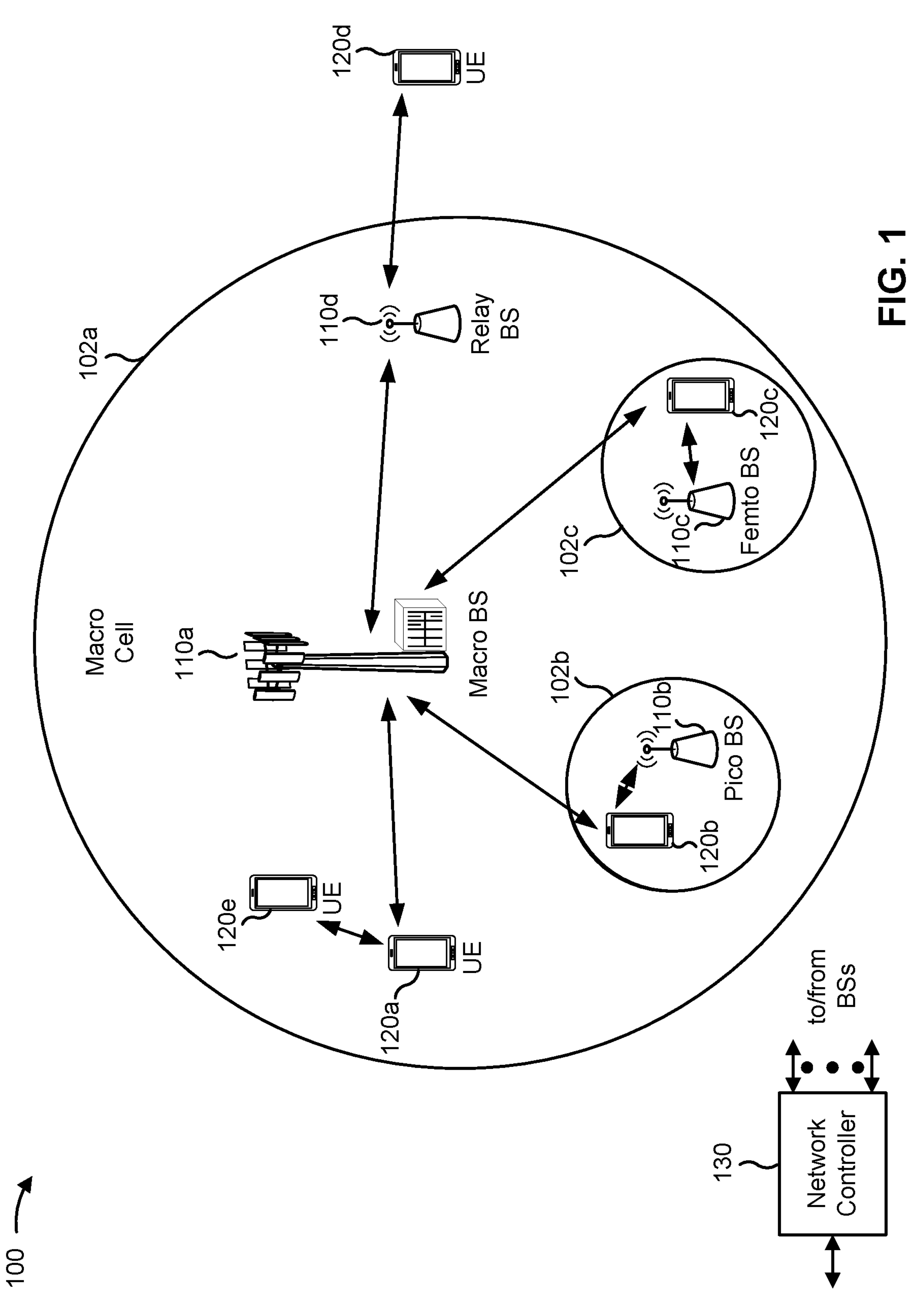
FIG. 1 is a block diagram conceptually illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

ABS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. ABS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110*d* may communicate with macro BS 110*a* and a UE 120*d* in order to facilitate communication between BS 110*a* and UE 120*d*. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120*a*, 120*b*, 120*c*) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

In some aspects, the base station 110 and/or the UE 120 may be capable of communicating (e.g., transmitting and/or receiving) using millimeter waves. To improve millimeter wave communication, the base station 110 and/or the UE 120 may use beamforming to focus a directional millimeter wave beam. The base station 110 and/or the UE 120 may use such beams to establish initial millimeter wave links, for control communications, for data communications (e.g., steady state data rate communications, peak data rate communications, and/or the like), and/or the like. Beamforming may be achieved using an antenna array by combining antenna elements in the antenna array such that signals at particular angles experience constructive interference while signals at other angles experience destructive interference. The base station 110 and/or the UE 120 may use millimeter wave beams to communicate with other devices (e.g., via BS-to-UE communication, UE-to-UE communication, BS-to-BS communication, and/or the like).

As indicated above, FIG. 1 is provided as an example. Other examples may differ from what is described with regard to FIG. 1.

Figure 2:
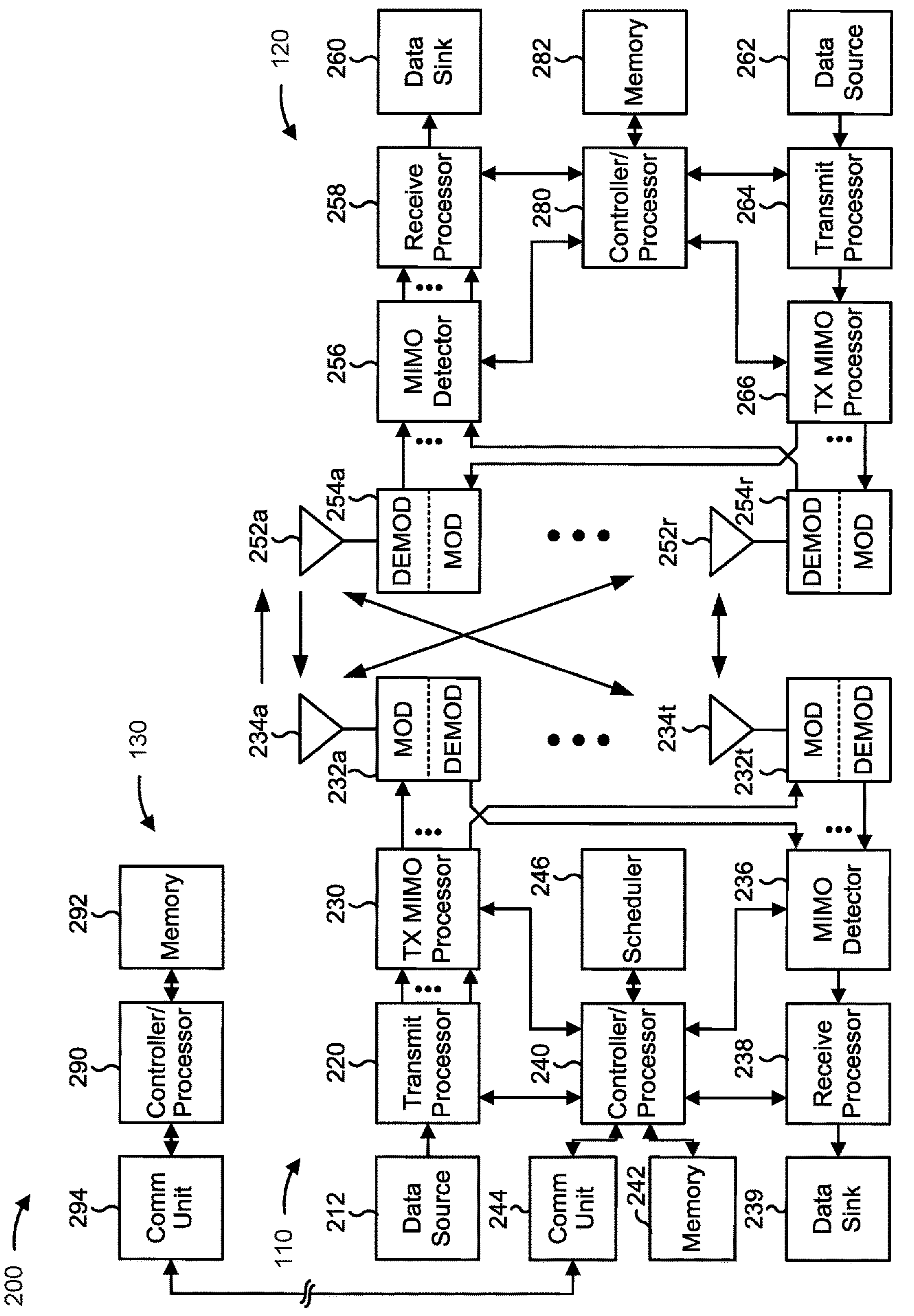
FIG. 2 is a block diagram conceptually illustrating an example of a base station in communication with a UE in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234*a* through 234*t*, and UE 120 may be equipped with R antennas 252*a* through 252*r*, where in general T>1 and R>1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232*a* through 232*t*. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232*a* through 232*t* may be transmitted via T antennas 234*a* through 234*t*, respectively. According to various aspects described in more detail below, the synchronization signals can be generated with location encoding to convey additional information.

At UE 120, antennas 252*a* through 252*r* may receive the downlink signals from base station 110 and/or other base stations and may provide received signals to demodulators (DEMODs) 254*a* through 254*r*, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254*a* through 254*r*, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254*a* through 254*r* (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with updating a spatial relation configuration of a UE for PUCCH transmissions using an enhanced medium access control (MAC) command element (CE), as described in more detail elsewhere herein. For example, controller/processor 240 of base station 110, controller/processor 280 of UE 120, and/or any other component(s) of FIG. 2 may perform or direct operations of, for example, process 1400 of FIG. 14, process 1500 of FIG. 15, process 1600 of FIG. 16, process 1700 of FIG. 17, and/or other processes as described herein. Memories 242 and 282 may store data and program codes for base station 110 and UE 120, respectively. In some aspects, memory 242 and/or memory 282 may comprise a non-transitory computer-readable medium storing one or more instructions for wireless communication. For example, the one or more instructions, when executed by one or more processors of the base station 110 and/or the UE 120, may perform or direct operations of, for example, process 1400 of FIG. 14, process 1500 of FIG. 15, process 1600 of FIG. 16, process 1700 of FIG. 17, and/or other processes as described herein. A scheduler 246 may schedule UEs for data transmission on the downlink and/or uplink.

In some aspects, UE 120 may include means for receiving a medium access control (MAC) command element (CE) indicating an update to a spatial relation configuration of the UE for physical uplink control channel (PUCCH) transmissions, the update indicated by PUCCH resource information, means for updating the spatial relation configuration of the UE with the PUCCH resource information, means for transmitting a PUCCH transmission using the spatial relation configuration, and/or the like. In some aspects, the PUCCH resource information includes a PUCCH resource identifier that identifies a PUCCH resource, and the PUCCH resource information includes identification information that identifies a particular spatial relation configuration of spatial settings and power control parameters for transmission on the PUCCH resource. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, UE 120 may include means for receiving a MAC CE indicating an update to a spatial relation configuration of the UE for PUCCH transmissions, the update indicated by group PUCCH resource information, means for updating the spatial relation configuration of the UE with the group PUCCH resource information, means for transmitting a PUCCH transmission using the spatial relation configuration, and/or the like. In some aspects, the group PUCCH resource information identifies a plurality of PUCCH resources, and the group PUCCH resource information includes a particular spatial relation configuration of spatial settings and power control parameters for transmission on the plurality of PUCCH resources, the particular spatial relation configuration being applicable to each PUCCH resource of the plurality of PUCCH resources. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, base station 110 may include means for generating a MAC CE indicating an update to a spatial relation configuration of a UE for PUCCH transmissions, the update indicated by PUCCH resource information, means for transmitting the MAC CE to the UE to update the spatial relation configuration of the UE for PUCCH transmissions, and/or the like. In some aspects, the PUCCH resource information includes a PUCCH resource identifier that identifies a PUCCH resource, and the PUCCH resource information includes identification information that identifies a particular spatial relation configuration of spatial settings and power control parameters for transmission on the PUCCH resource. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

In some aspects, base station 110 may include means for generating a MAC CE indicating an update to a spatial relation configuration of a UE for PUCCH transmissions, the update indicated by group PUCCH resource information, means for transmitting the MAC CE to the UE to update the spatial relation configuration of the UE for PUCCH transmissions, and/or the like. In some aspects, the group PUCCH resource information identifies a plurality of PUCCH resources, and the group PUCCH resource information includes a particular spatial relation configuration of spatial settings and power control parameters for transmission on the plurality of PUCCH resources, the particular spatial relation configuration being applicable to each PUCCH resource of the plurality of PUCCH resources. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

As indicated above, FIG. 2 is provided as an example. Other examples may differ from what is described with regard to FIG. 2.

Figure 3A:
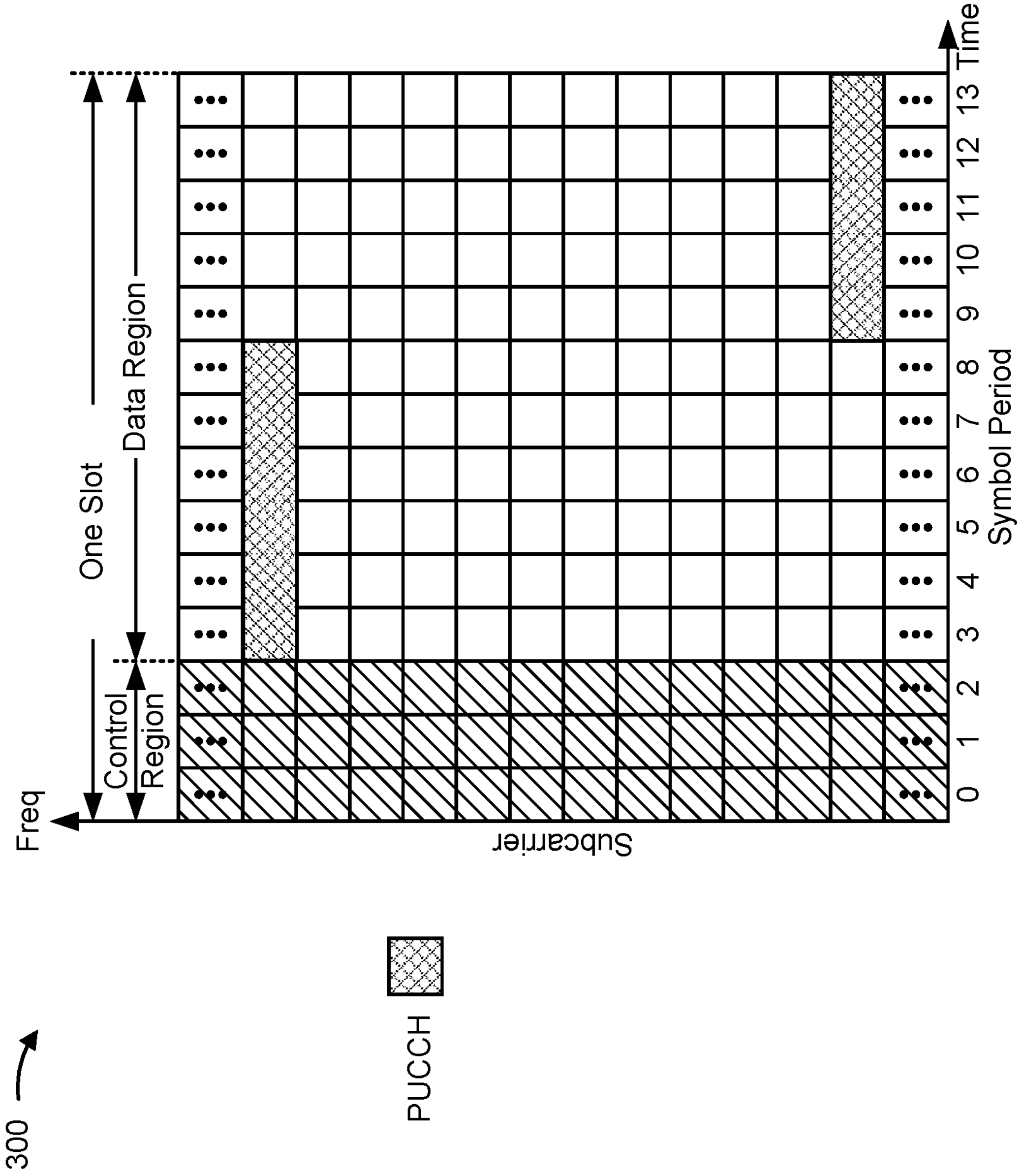
FIG. 3A is a block diagram conceptually illustrating an example slot format with a physical uplink control channel (PUCCH).

FIG. 3A is a block diagram conceptually illustrating an example slot format 300 with a PUCCH. Available time frequency resources may be partitioned into resource blocks. Each resource block may cover a set of subcarriers (e.g., 12 subcarriers) in one slot and may include a number of resource elements. Each resource element may cover one subcarrier in one symbol period (e.g., in time) and may be used to send one modulation symbol, which may be a real or complex value. In each resource block, some of the resource elements may be used for PUCCH transmissions, as shown in FIG. 3A. As indicated above, FIG. 3A is provided as an example. Other examples may differ from what is described with regard to FIG. 3A.

The PUCCH transmissions may transmitted according to a spatial relation configuration. A spatial relation configuration may include a particular combination of one or more spatial settings, one or more power control parameters, codebook, and/or the like. A spatial setting may include one or more reference signals to define a transmission beam a UE may use for PUCCH transmissions. Beamforming may be achieved using an antenna array by combining antenna elements in the antenna array such that signals at particular angles experience constructive interference while signals at other angles experience destructive interference. A base station and a UE may communicate using millimeter wave beams. Power control parameters may include a power output, path loss reference signals, and/or the like. A base station may configure (or rather preconfigure) a UE with a spatial relation configuration via radio resource control (RRC) signaling. The UE may, in turn, transmit a PUCCH transmission using a spatial domain filter that is based at least in part on the spatial relation configuration. The base station may send a MAC CE with information to update the spatial relation configuration of the UE. The UE may use information in the MAC CE to activate a spatial relation setting or deactivate a spatial relation setting in the spatial relation configuration of the UE.

Figure 3B:
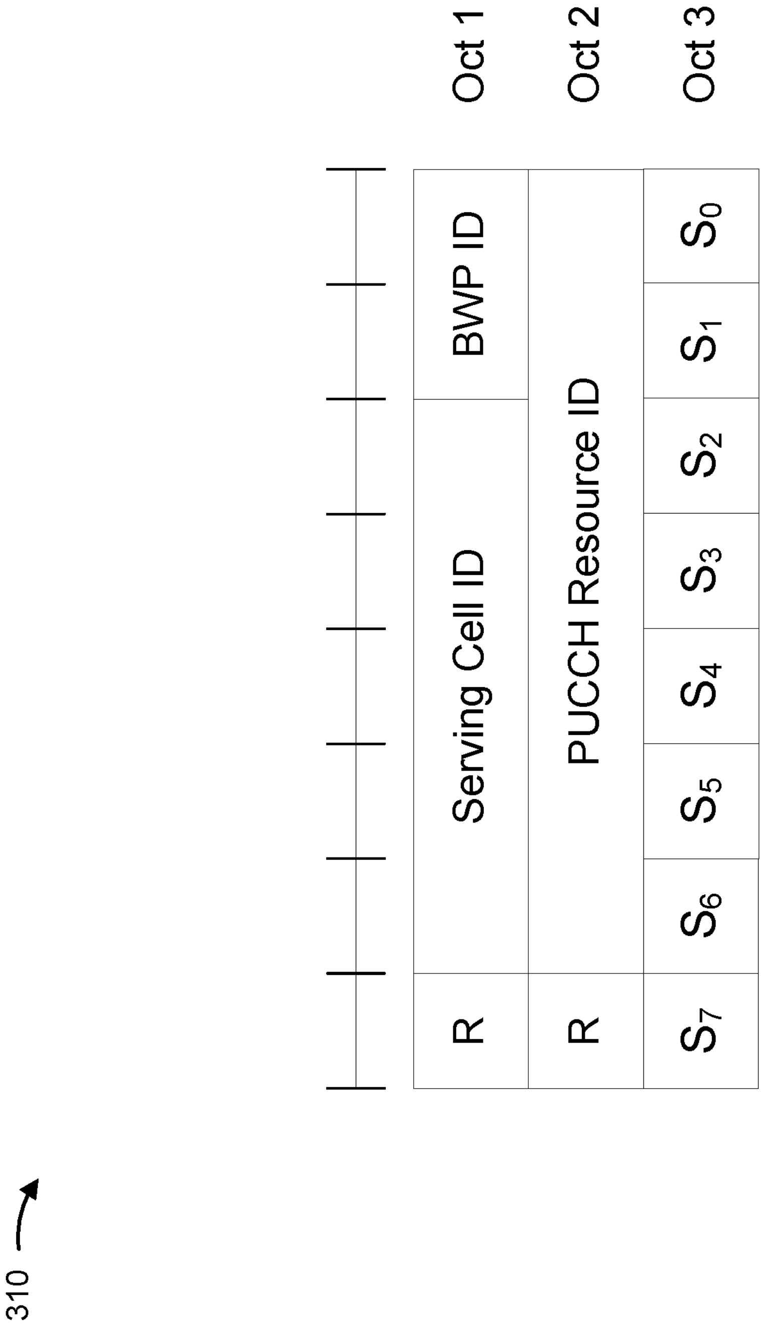
FIG. 3B is an example structure of a conventional medium access control (MAC) command element (CE) for 8 candidate spatial relation settings.

FIG. 3B is an example structure of a conventional MAC CE 310 for 8 candidate spatial relation settings. MAC CE 310 is used to update a spatial relation configuration of a UE for PUCCH transmissions. MAC CE 310 includes a structure that is organized into multiple octets of bits (8 bits). MAC CE 310 may include a serving cell identifier (ID), a bandwidth part (BWP) ID, a PUCCH resource ID, and spatial relation information. The serving cell ID may be 5 bits and may identify a serving cell for which MAC CE 310 applies. The BWP ID may be 2 bits and may indicate an uplink BWP for which MAC CE 310 applies. The PUCCH resource ID may be 7 bits and may identify a PUCCH resource out of 128 possible PUCCH resources. "R" fields are reserve bits set to "0". MAC CE 310 also includes an array of bits, designated as $S_0$ to $S_7$, to identity a spatial relation setting. There are 8 candidate spatial relation settings. An "$S_i$" bit set to "1" will activate the spatial relation setting. An "$S_i$" bit set to "0" will deactivate the spatial relation setting.

However, in 5G, a number of candidate spatial relation settings that a UE uses is being extended from 8 bits to 64 bits, and conventional MAC CE 310 does not include an explicit spatial relation identifier. It is recognized herein that a MAC CE needs to be enhanced to account for this increase in candidate spatial relation settings, and enhanced in an effective way. If a UE does not receive a MAC CE that effectively activates or deactivates a spatial relation setting, the UE may not use the most efficient spatial relation setting and this may lead to retransmissions. The UE and a receiving base station may waste power, and processing and beamforming resources sending retransmissions that would not be necessary with a more efficient PUCCH transmission spatial relation setting. Additionally, or alternatively, a base station may have to send multiple MAC CEs to address multiple PUCCH resources. The base station and a receiving UE may expend power, and processing and signaling resources handling multiple MAC CEs.

Some aspects described herein provide techniques and apparatuses for enhancing PUCCH spatial relation information in a MAC CE. In some aspects, a base station may generate and provide a MAC CE that is enhanced to include spatial relation information that uses an explicit spatial relation identifier to identify a particular spatial relation configuration. Additionally, or alternatively, a base station may generate and provide a MAC CE that identifies a group of PUCCH resources so that the base station may update multiple PUCCH resources in the group with a spatial relation identifier. A UE may receive the MAC CE and update a spatial relation configuration. The UE may use the spatial relation configuration to transmit PUCCH transmissions. The UE and the receiving base station may save power, and processing and beamforming resources by not sending retransmissions that would be necessary with inefficient PUCCH transmissions. The base station and receiving UE may also save power, and processing and signaling resources by using a single MAC CE to update spatial relation settings for multiple PUCCH resources.

Figure 4:
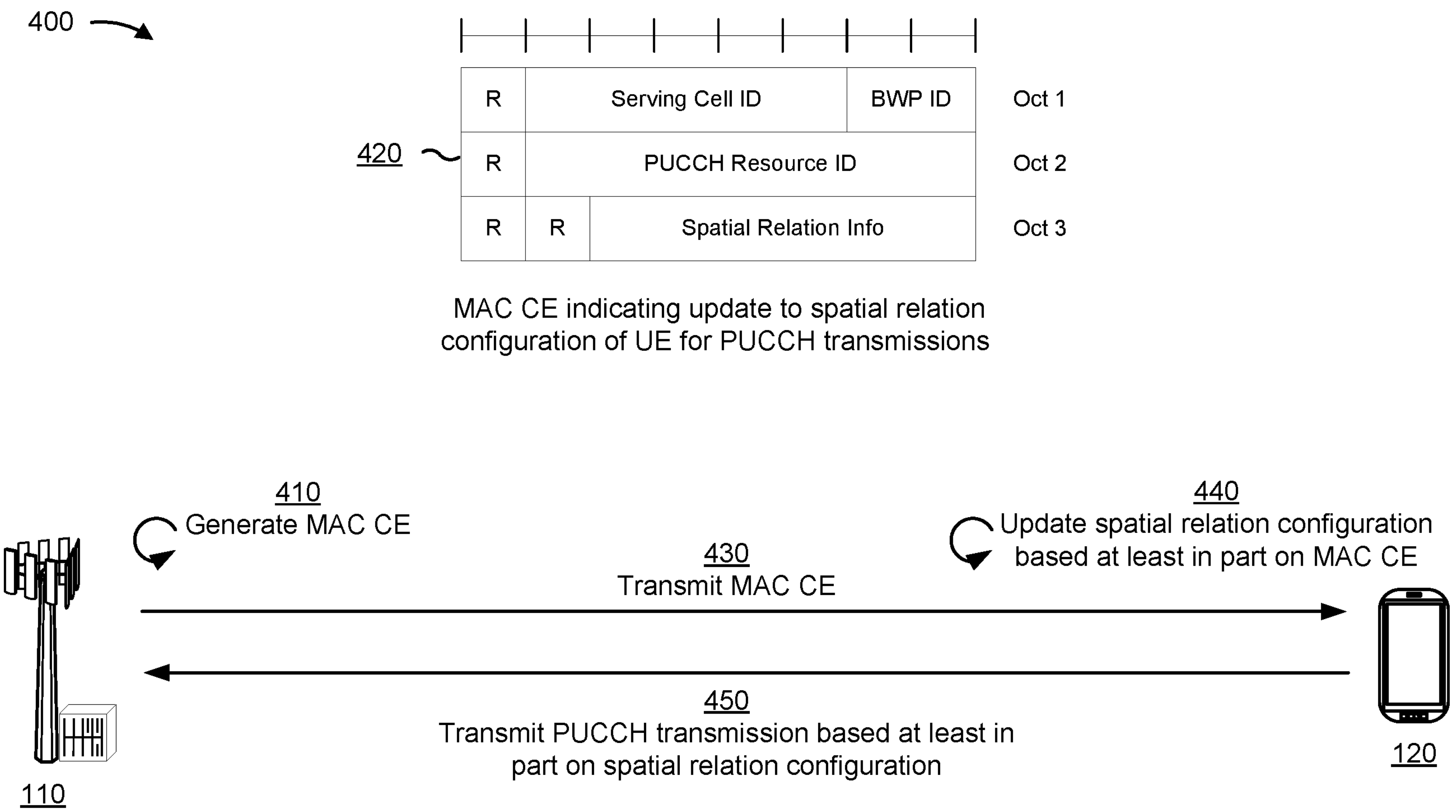
FIG. 4 illustrates an example of a base station updating, with a MAC CE, a spatial relation configuration of a UE for PUCCH transmissions, in accordance with various aspects of the present disclosure.

FIG. 4 illustrates an example 400 of a base station updating, with a MAC CE, a spatial relation configuration of a UE for PUCCH transmissions, in accordance with various aspects of the present disclosure. As shown by FIG. 4, and by reference number 410, base station 110 may generate MAC CE 420. Base station 110 may generate MAC CE 420 based at least in part on information about a transmission path for UE 120 for PUCCH transmissions. For example, base station 110 may generate MAC CE 420 with PUCCH resource information that is based at least in part on reference signal measurements for PUCCH from UE 120.

As shown in FIG. 4, a MAC CE 420 may include a structure that is organized, for example, into multiple octets (8 bits). MAC CE 420 may include a serving cell ID, a BWP ID, and a PUCCH resource ID. The PUCCH resource ID may be 1 to 7 bits to indicate any one of up to (or more than) 128 PUCCH resources.

MAC CE 420 may identify a particular spatial relation configuration. However, rather than using an array of bits with separate "S" bits for each separate spatial relation setting, as shown by MAC CE 310 in FIG. 3B, base station 110 may generate MAC CE 420 to indicate spatial relation information with one field for an explicit spatial relation identifier. For example, the spatial relation information may be 6 bits that identifies a number between 0 and 63, corresponding to an identifier for one of 64 candidate spatial relation settings that are possible with an extension from 8 to 64 spatial relation settings. As shown by reference number 430, base station 110 may transmit MAC CE 420 to UE 120.

As shown by reference number 440, UE 120 may update a spatial relation configuration with the PUCCH resource information based at least in part on MAC CE 420. For example, UE 120 may activate or deactivate a particular spatial relation configuration of spatial settings and power control parameters, based at least in part on identification information included in the PUCCH resource information. As shown by reference number 450, UE 120 may transmit a PUCCH transmission to base station 110 based at least in part on the spatial relation configuration.

As indicated above, FIG. 4 is provided as an example. Other examples may differ from what is described with respect to FIG. 4.

Figure 5:
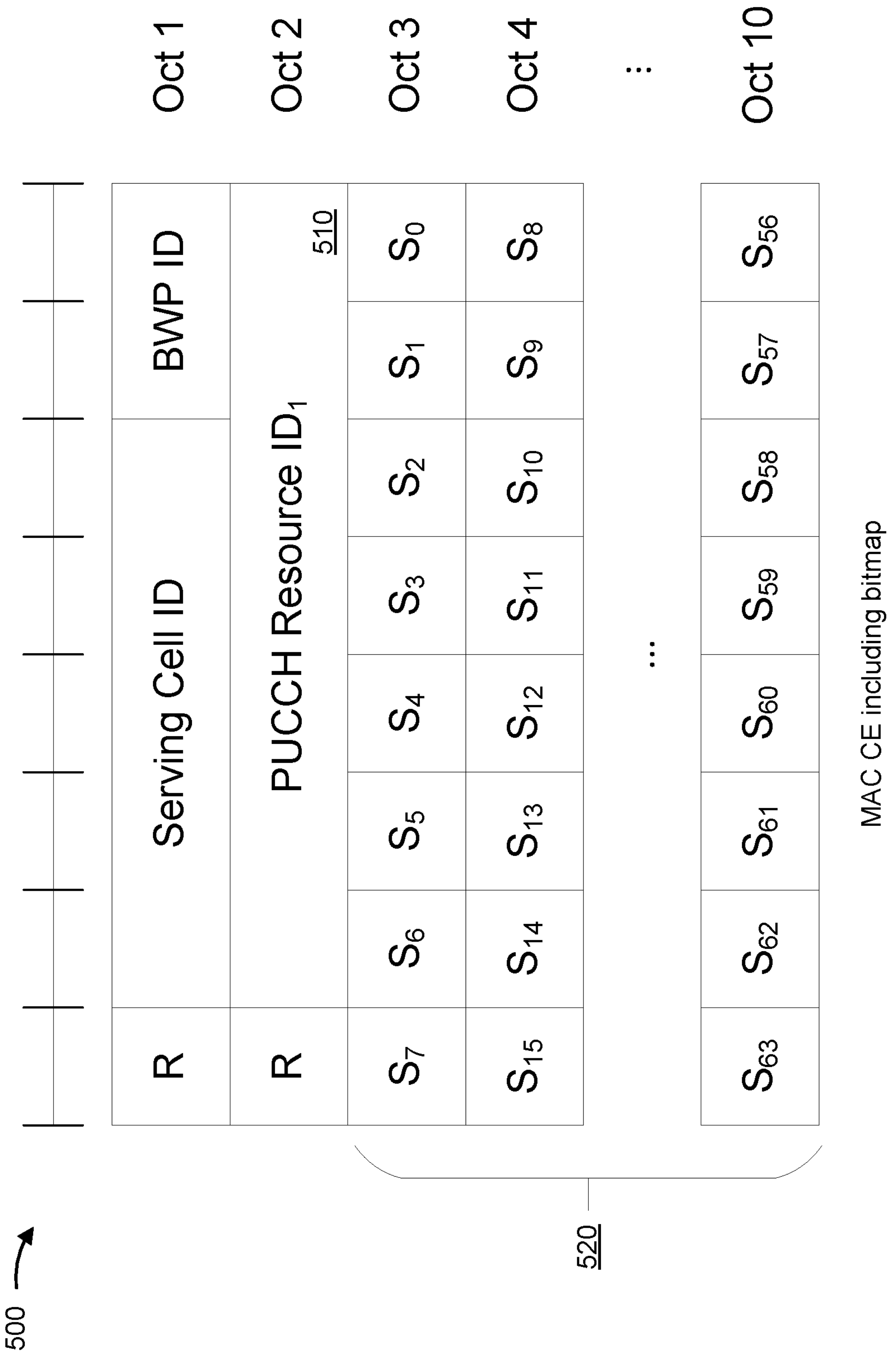
FIG. 5 illustrates an example structure of a MAC CE that includes a bitmap for updating of a spatial relation configuration of a UE, in accordance with various aspects of the present disclosure.

FIG. 5 illustrates an example structure of a MAC CE 500 that includes a bitmap for updating a spatial relation configuration of a UE, in accordance with various aspects of the present disclosure. MAC CE 500 may include, for example, a PUCCH resource ID 510 and a bitmap 520 of 64 candidate spatial relation configurations, labeled $S_0$ to $S_{63}$. By way of example, if UE 120 is to be configured with a particular spatial relation configuration identified by $S_6$, base station 110 may set the bit for $S_6$ to "1". Base station 110 may set all other bits in the bitmap (i.e., bits $S_0$-$S_5$ and $S_7$-$S_{63}$) to "0".

In some aspects, base station 110 may have preconfigured UE 120 to store a particular combination of spatial setting, power control parameter, reference signal, and/or the like, for spatial relation configuration $S_6$. This particular spatial relation configuration may differ from other candidate spatial relation configurations corresponding to $S_0$-$S_5$ and $S_7$-$S_{63}$. Accordingly, when UE 120 receives MAC CE 500 and determines that a bit $S_6$ is set to "1" and bits $S_0$-$S_5$ and $S_7$-$S_{63}$ are set to "0", UE 120 may determine, from stored information, a particular spatial relation configuration corresponding to $S_6$. UE 120 may update the spatial relation configuration of the UE based at least in part on the particular spatial relation configuration stored for $S_6$. As indicated above, FIG. 5 is provided as an example. Other examples may differ from what is described with respect to FIG. 5.

Figure 6:
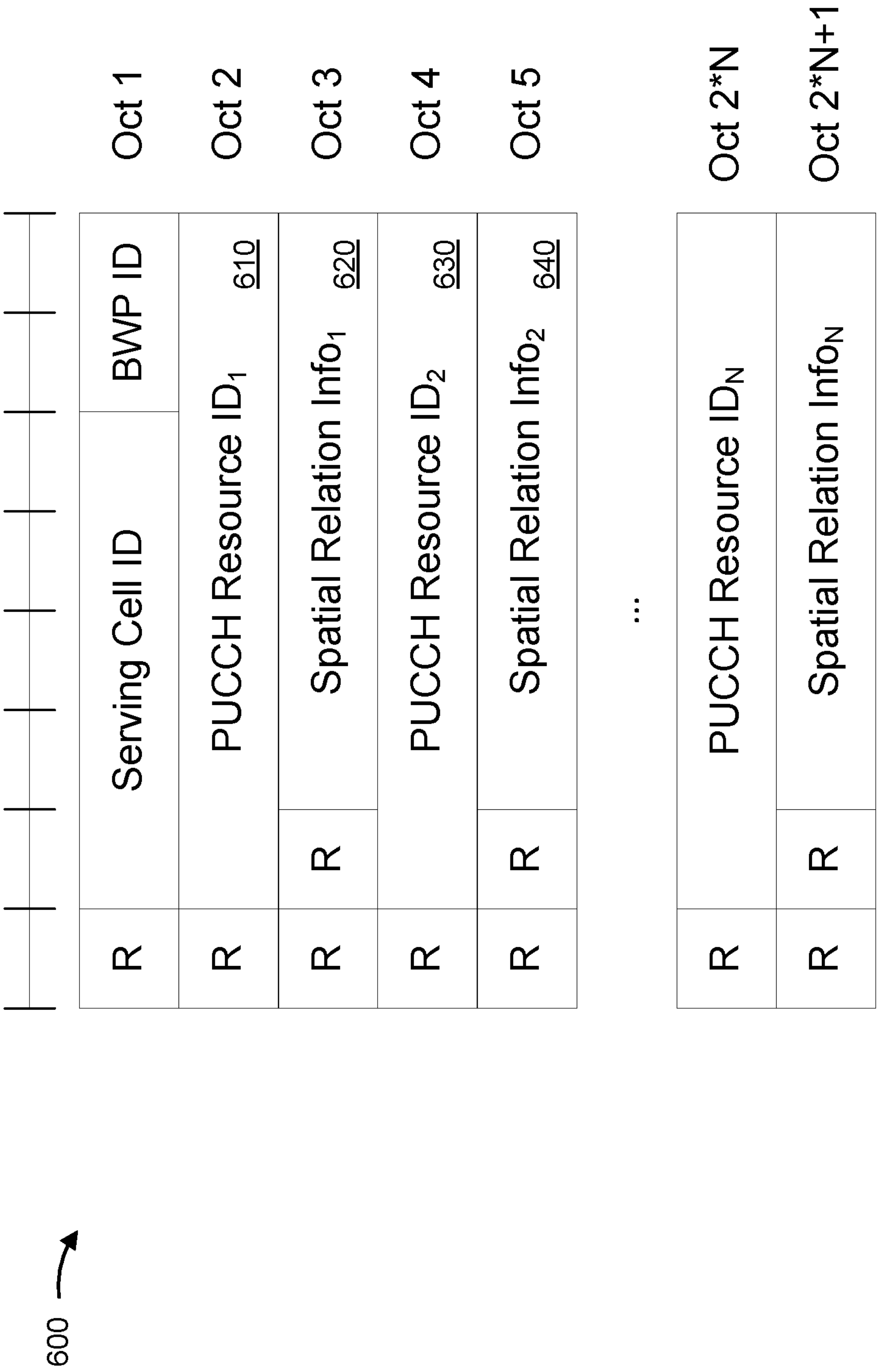
FIG. 6 illustrates an example structure of a MAC CE that includes spatial relation identifiers for multiple PUCCH resources for updating a spatial relation configuration of a UE, in accordance with various aspects of the present disclosure.

FIG. 6 illustrates an example structure of a MAC CE 600 that includes spatial relation identifiers for multiple PUCCH resources for updating a spatial relation configuration of a UE, in accordance with various aspects of the present disclosure. MAC CE 600 may include, for example, a first PUCCH resource ID (e.g., shown as PUCCH Resource $ID_1$ 610) and first spatial relation information (e.g., shown as Spatial Relation $Info_1$ 620) corresponding to the first PUCCH resource ID. MAC CE 600 may also include a second PUCCH resource ID (e.g., shown as PUCCH Resource $ID_2$ 630) and second spatial relation information (e.g., shown as Spatial Relation $Info_2$ 640) corresponding to the second PUCCH resource ID. By way of example, base station 110 may generate MAC CE 600 to include first spatial relation information bits set to 6 for the first PUCCH resource ID of 3 and second spatial relation information bits set to 53 for the second PUCCH resource ID of 104. UE 120 may receive MAC CE 600 and correspondingly update PUCCH resource ID 3 to a particular spatial relation configuration identified by bits set to 6 and update PUCCH resource ID 104 to a particular spatial relation configuration identified by bits set to 53. That is, with single MAC CE 600, base station 110 may update two different PUCCH resources for the spatial relation configuration of UE 120 with two different spatial relation settings.

Additionally, or alternatively, MAC CE 600 may include more than two PUCCH resource IDs with corresponding spatial relation information for each PUCCH resource ID. Because spatial relation information may be indicated with explicit spatial relation identifiers, base station 110 may generate information for many PUCCH resources in a single MAC CE. This saves power, and processing and signaling resources that would otherwise be spent sending additional MAC CEs to convey, to the UE, spatial relation configuration information for different PUCCH resources. As indicated above, FIG. 6 is provided as an example. Other examples may differ from what is described with respect to FIG. 6.

Figure 7:
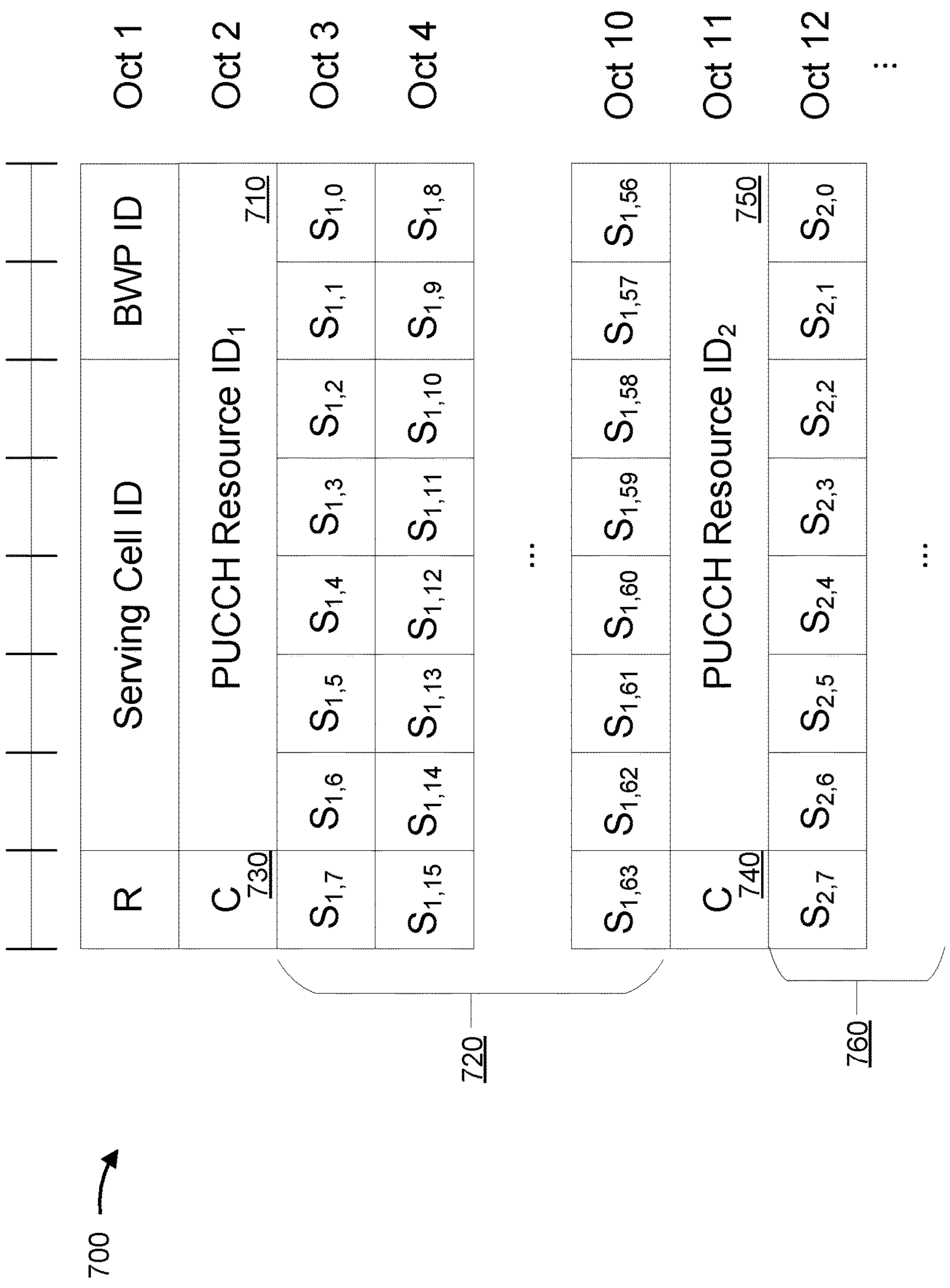
FIG. 7 illustrates an example structure of a MAC CE that includes bitmaps for multiple PUCCH resources for updating a spatial relation configuration of a UE, in accordance with various aspects of the present disclosure.

FIG. 7 illustrates an example structure of a MAC CE 700 that includes bitmaps for multiple PUCCH resources for updating a spatial relation configuration of a UE, in accordance with various aspects of the present disclosure. MAC CE 700 may include, for example, a first PUCCH resource $ID_1$ 710 and spatial relation information in a form of a bitmap 720 (e.g., 64 bits) corresponding to first PUCCH resource $ID_1$ 710. MAC CE 700 may also include a second PUCCH resource $ID_2$ 750 and spatial relation information, in the form of a bitmap 760, corresponding to second PUCCH resource $ID_2$ 750.

Additionally, or alternatively, MAC CE 700 may include a conditional bit 730 that is associated with second PUCCH resource $ID_2$ 750 and that indicates whether identification information (e.g., spatial relation information in bitmap 760) is present for second PUCCH resource $ID_2$ 750. A "1" bit may indicate spatial relation information is present. A "0" bit may indicate that spatial relation information is not present and UE 120 may stop reading bits for PUCCH resource $ID_2$ 750's portion of MAC CE 700.

By way of example, if base station 110 is to update the spatial relation configuration of UE 120 for a particular PUCCH resource, base station 110 may set an appropriate bit of spatial relation information in MAC CE 700 (e.g., $S_6$ is set to "1", as in the example of FIG. 5, and all other bits are set to "0") and may set C 730 to a "1". When UE 120 receives MAC CE 700, UE 120 may detect that conditional bit C 730 is set to "1". This will indicate the presence of PUCCH resource $ID_2$ 750 and corresponding spatial relation information in bitmap 760. UE 120 may then read bitmap 760 to determine which particular spatial relation configuration to use. Here, it could be $S_{2,2}$. UE 120 may then detect that conditional bit 740 is set to "0". Accordingly, UE 120 halts reading of any spatial relation information bits for the next PUCCH resource ID (e.g., PUCCH resource $ID_3$, not shown in FIG. 5). That is, UE 120 may update the spatial configuration of UE 120 for PUCCH resource $ID_1$ 710 and PUCCH resource $ID_2$ 750, but not a third PUCCH resource $ID_3$. As a result, UE 120 may save power and processing resources by not processing what may be an entirety of a large MAC CE when it is not necessary. As indicated above, FIG. 7 is provided as an example. Other examples may differ from what is described with respect to FIG. 7.

Figure 8:
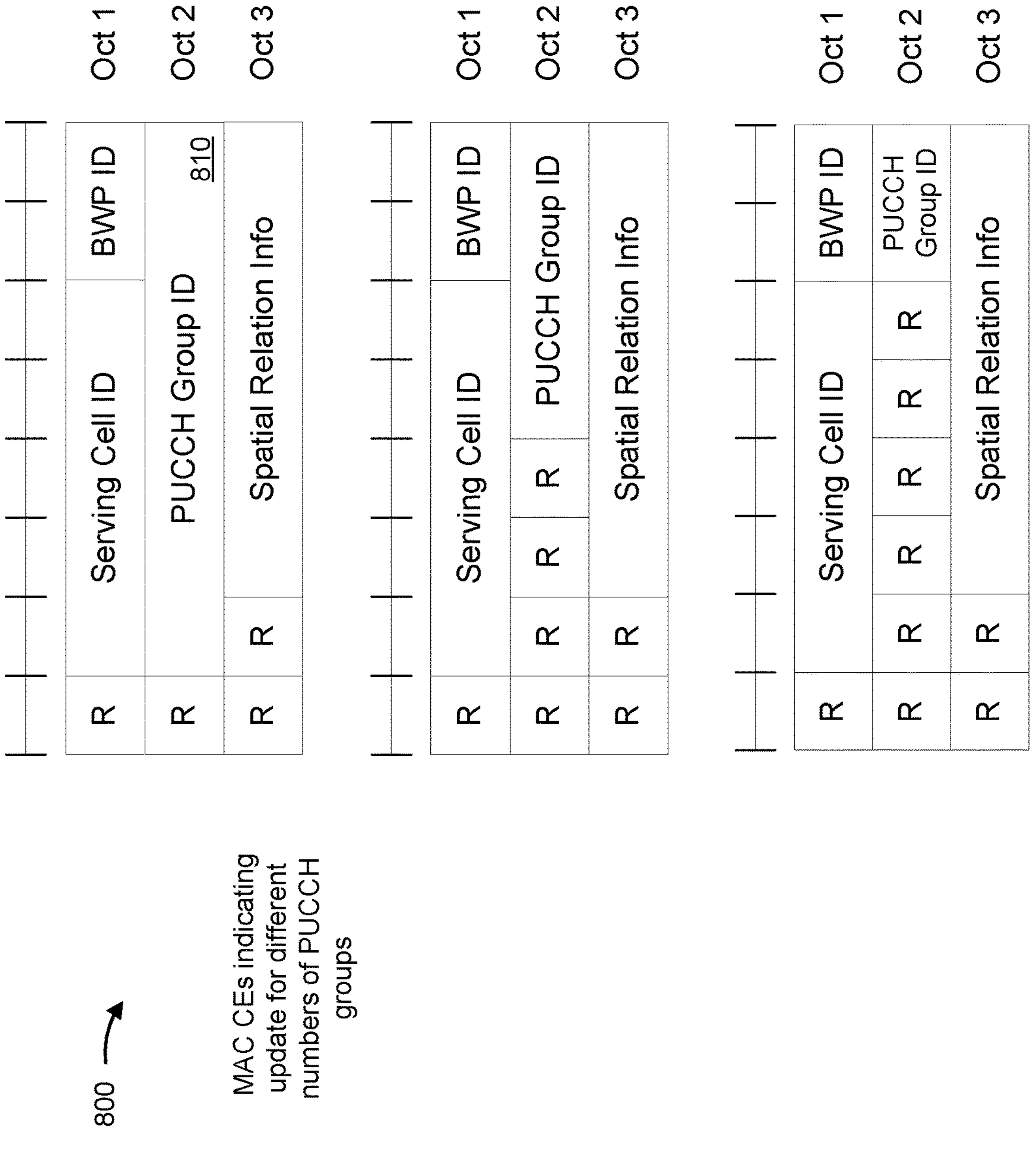
FIG. 8 illustrates example structures of a MAC CE for different numbers of PUCCH groups, in accordance with various aspects of the present disclosure.

FIG. 8 illustrates example structures of a MAC CE 800 for different numbers of PUCCH groups, in accordance with various aspects of the present disclosure. For example, a PUCCH group ID field 810 may be 7 bits (top MAC CE in FIG. 8), 4 bits (middle MAC CE in FIG. 8), or 2 bits (bottom MAC CE in FIG. 8). These are merely examples, and a PUCCH group identifier may be 1 bit to 7 bits. In some aspects, more than 7 bits may be used. In one example, PUCCH resource identifiers 0-7 may be one group, and PUCCH resource identifiers 8-15 may be another group. In another example, PUCCH resource identifier 0-63 may be a first PUCCH group, and PUCCH resource identifiers 64-127 may be a second group. As indicated above, FIG. 8 is provided as one or more examples. Other examples may differ from what is described with respect to FIG. 8.

Figure 9:
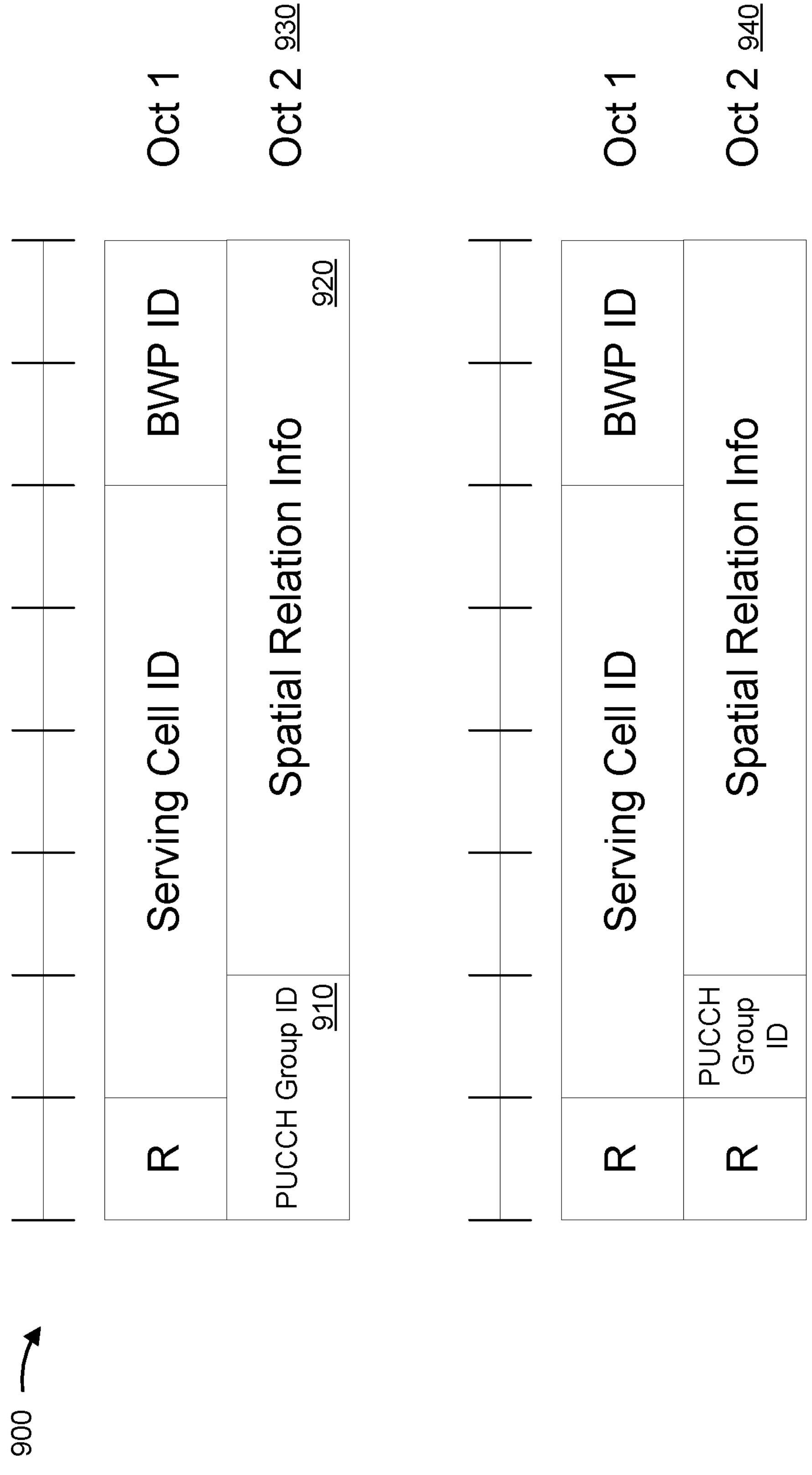
FIG. 9 illustrates example structures of a MAC CE with spatial relation information and a PUCCH group identifier on a single octet of the MAC CE, in accordance with various aspects of the present disclosure.

FIG. 9 illustrates example structures of a MAC CE 900 with spatial relation information and a PUCCH group identifier on a single octet of the MAC CE 900, in accordance with various aspects of the present disclosure. In some aspects, spatial relation information 920 may occupy 6 bits (64 possible spatial relation configurations) and PUCCH group identifier 910 may occupy 2 bits (4 possible PUCCH groups) in a single octet 930. In some aspects, and as shown by reference number 940, PUCCH group identifier 910 may occupy just 1 bit (2 possible PUCCH groups). As indicated above, FIG. 9 is provided as one or more examples. Other examples may differ from what is described with respect to FIG. 9.

Figure 10:
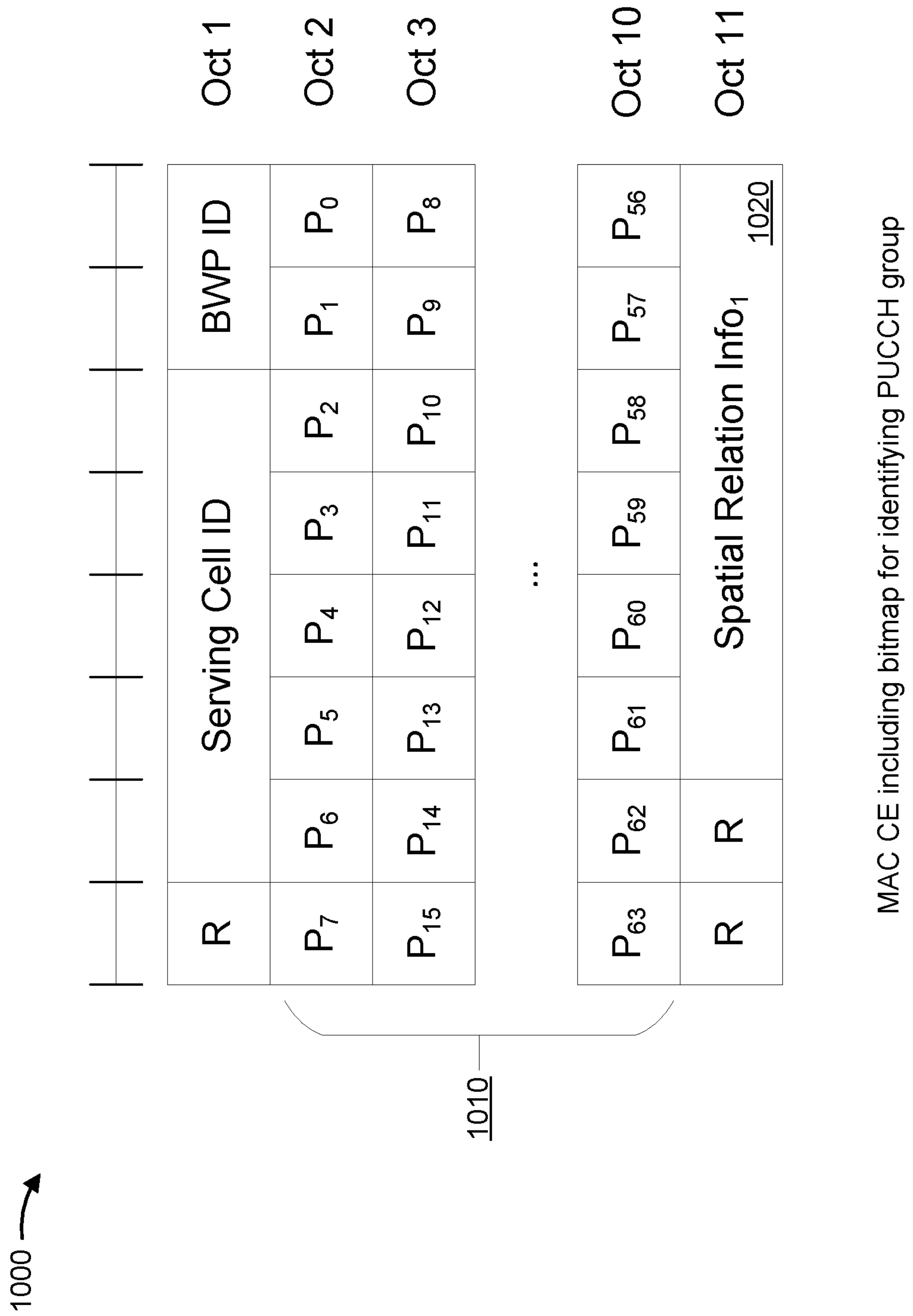
FIG. 10 illustrates an example structure of a MAC CE that includes a bitmap for identifying a PUCCH group for updating a spatial relation configuration of a UE, in accordance with various aspects of the present disclosure.

FIG. 10 illustrates an example structure of a MAC CE 1000 that includes a bitmap 1010 for identifying a PUCCH group for updating a spatial relation configuration of a UE, in accordance with various aspects of the present disclosure. For example, bitmap 1010 may indicate a PUCCH group that corresponds to spatial relation information 1020. The PUCCH group may have multiple bits set to "1" in the bitmap to identify which PUCCH resources are in the PUCCH group, while all other bits in bitmap 1010 are set to "0". By way of example, if base station 110 is to update the spatial relation configuration of UE 120 for a particular group of PUCCH resources, base station 110 may set appropriate bits of a PUCCH group in MAC CE 1000 to "1" (e.g., $P_{13}$, $P_{35}$, $P_{44}$, and $P_{56}$ are set to "1" and all other bits are set to "0"). UE 120 may determine a group of PUCCH resources from the "1" bits in MAC CE 1000 and update all of these PUCCH resources in the spatial relation configuration based at least in part on spatial relation information 1020. As indicated above, FIG. 10 is provided as an example. Other examples may differ from what is described with respect to FIG. 10.

Figure 11:
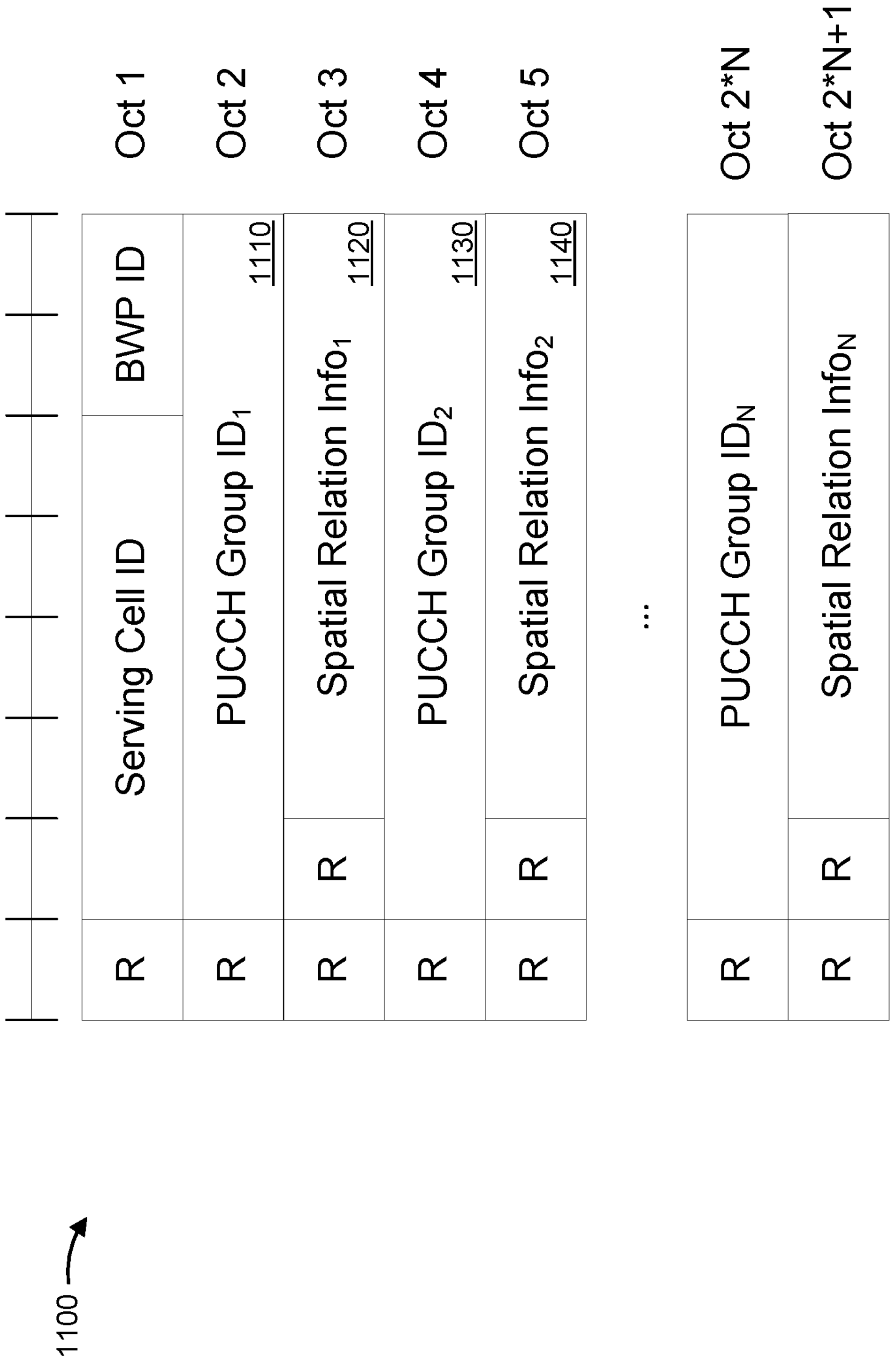
FIG. 11 illustrates an example structure of a MAC CE that includes spatial relation information for multiple PUCCH groups for updating a spatial relation configuration of a UE, in accordance with various aspects of the present disclosure.

FIG. 11 illustrates an example structure of a MAC CE 1100 that includes spatial relation information for multiple PUCCH groups for updating a spatial relation configuration of a UE, in accordance with various aspects of the present disclosure. For example, a first PUCCH group ID 1110 may correspond to a first spatial relation information 1120 (e.g., spatial relation identifier), a second PUCCH group ID 1130 may correspond to a second spatial relation information 1140 (e.g., spatial relation identifier), and/or the like. By way of example, base station 110 may indicate, with 7 bits, a particular PUCCH group ID. Base station 110 may have preconfigured UE 120 (e.g., via radio resource control (RRC) signaling) with which PUCCH resources belong to which PUCCH group ID. UE 120 may receive MAC CE 1100 and identify, from bits in PUCCH group ID field 1110, a group of particular PUCCH resources. UE 120 may update the spatial relation configuration of the UE for the particular PUCCH resources based at least in part on spatial relation information 1120 (e.g., spatial relation identifier). UE 120 may also identify, from bits in PUCCH group ID field 1130 of MAC CE 1100, another group of particular PUCCH resources. UE 120 may update the spatial relation configuration of the UE for this other group of particular PUCCH resources, and update this other group of PUCCH resources based at least in part on spatial relation information 1140 (e.g., spatial relation identifier). As indicated above, FIG. 11 is provided as an example. Other examples may differ from what is described with respect to FIG. 11.

Figure 12:
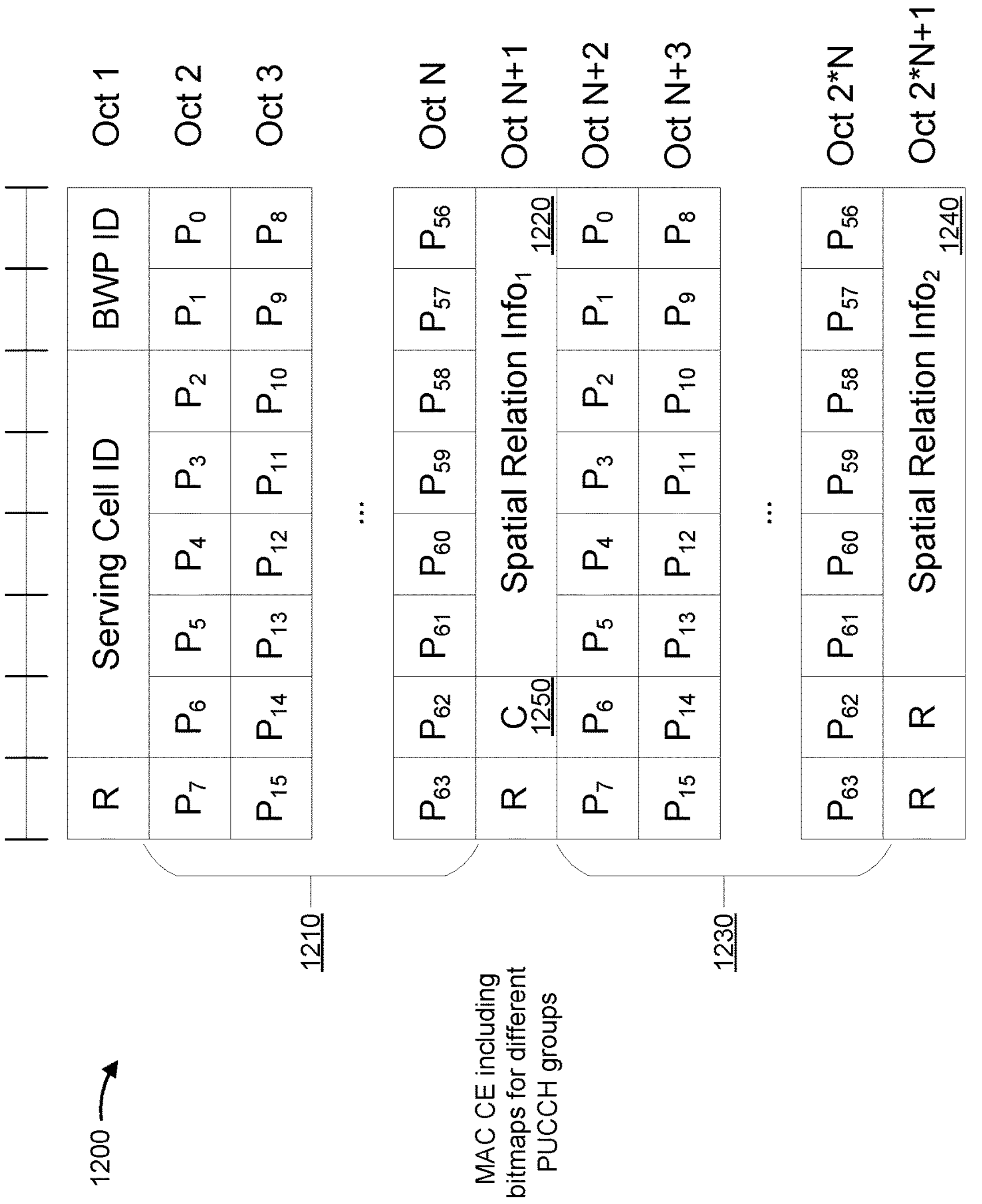
FIG. 12 illustrates an example structure of a MAC CE that includes bitmaps for identifying multiple PUCCH groups for updating a spatial relation configuration of a UE, in accordance with various aspects of the present disclosure.

FIG. 12 illustrates an example structure of a MAC CE 1200 that includes bitmaps for identifying multiple PUCCH groups for updating a spatial relation configuration of a UE, in accordance with various aspects of the present disclosure. For example, a first bitmap 1210 may be used to identify a first PUCCH group identifier for which first spatial relation information 1220 applies. A first conditional bit 1250 may indicate that there is second spatial relation information 1240 that corresponds to a second PUCCH group identifier, which may be indicated by a second bitmap 1230. A second conditional bit 1260 may whether there is third spatial relation information (not shown in FIG. 12) that corresponds to a third PUCCH group identifier (not shown). In some aspects, there may be additional spatial relation information that corresponds to additional PUCCH group identifiers. This may be signaled by additional conditional bits.

By way of example, if base station 110 is to update the spatial relation configuration of UE 120 for multiple groups of PUCCH resources, base station 110 may set appropriate bits of bitmap 1210 in MAC CE 1200 (e.g., $P_{13}$, $P_{35}$, $P_{44}$, and $P_{56}$ are set to "1", as in the example of FIG. 10, and all other bits are set to "0"). Base station 110 may set C 1250 to "1" and set appropriate bits of bitmap 1230 in MAC CE 1200 (e.g., $P_{23}$, $P_{45}$, and $P_{61}$ are set to "1", and all other bits are set to "0"). When UE 120 receives MAC CE 1200, UE 120 may determine that bits for PUCCH resources $P_{13}$, $P_{35}$, $P_{44}$, and $P_{56}$ in bitmap 1210 are set to "1". UE 120 may then read spatial relation information 1220 to determine which particular spatial relation configuration to use for the PUCCH resources identified by $P_{13}$, $P_{35}$, $P_{44}$, and $P_{56}$. UE 120 may then detect that conditional bit 1250 of MAC CE 1200 is set to "1". UE 120 may determine that bits for PUCCH resources $P_{23}$, $P_{45}$, and $P_{61}$ in bitmap 1230 are set to "1". UE 120 may then read spatial relation information 1240 to determine which particular spatial relation configuration to use for the PUCCH resources identified by $P_{23}$, $P_{45}$, and $P_{61}$. In sum, UE 120 may update the spatial configuration of UE 120 for the PUCCH resources identified by $P_{13}$, $P_{35}$, $P_{44}$, and $P_{56}$ based at least in part on spatial relation information 1220 and for the PUCCH resources identified by $P_{23}$, $P_{45}$, and $P_{61}$ based at least in part on spatial relation information 1240.

Alternatively, base station 110 may have set C 1250 to "0". Accordingly, UE 120 may halt reading of PUCCH resource bits in bitmap 1230 and any bits for spatial relation information 1240. That is, in this alternative example, UE 120 may update the spatial configuration of UE 120 for the PUCCH resources identified by $P_{13}$, $P_{35}$, $P_{44}$, and $P_{56}$, but not any other PUCCH resources that would be associated with bitmap 1230. By halting reading of bits based at least in part on a conditional bit, UE 120 may save power and processing resources by not processing what may be an entirety of a large MAC CE when it is not necessary. As indicated above, FIG. 12 is provided as an example. Other examples may differ from what is described with respect to FIG. 12.

Figure 13:
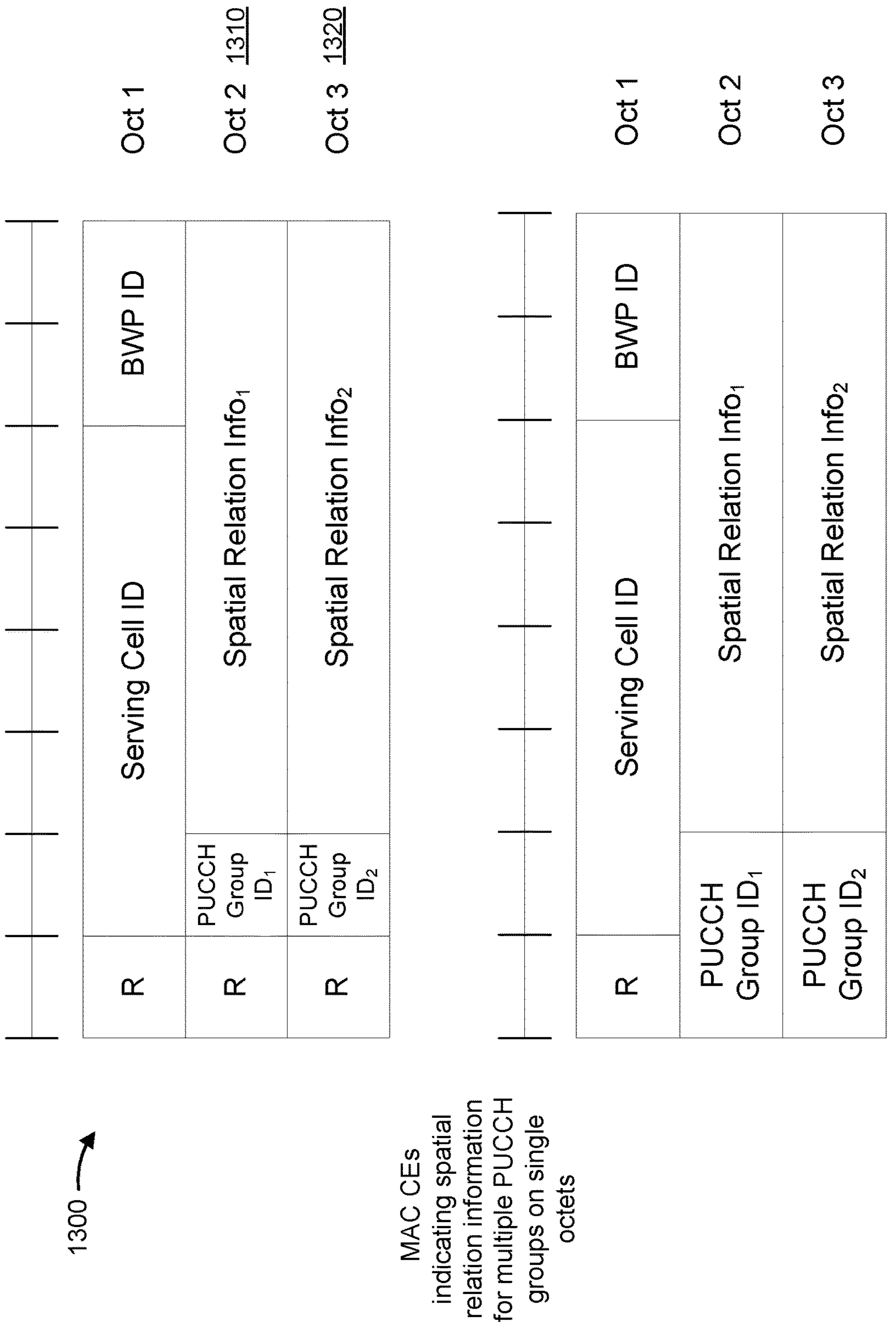
FIG. 13 illustrates example structures of a MAC CE with spatial relation information and a PUCCH group identifier on a single octet for multiple octets, in accordance with various aspects of the present disclosure.

FIG. 13 illustrates example structures of a MAC CE 1300 with spatial relation information and a PUCCH group identifier on a single octet for multiple octets, in accordance with various aspects of the present disclosure. For example, a first octet 1310 includes a first PUCCH group ID (e.g., shown as PUCCH Group $ID_1$) and first spatial relation information (e.g., shown as Spatial Relationship $Info_1$), and a second octet 1320 includes a second PUCCH group ID (e.g., shown as PUCCH Group $ID_2$) and second spatial relation information (e.g., shown as Spatial Relationship $Info_2$). In some aspects, base station 110 may generate MAC CE 1300 to have 6 bits that identify spatial relation information (e.g., spatial relation identifier) and 1 bit that identifies one of two PUCCH resource groups. These bits may be in a single octet 1310. Additionally, or alternatively, base station 110 may generate multiple octets, such as octets 1310 and 1320.

In some aspects, base station 110 may generate MAC CE 1300 to have one or more octets that have 6 bits that identify spatial relation information and 2 bits that identify one of four PUCCH resource groups. As indicated above, FIG. 13 is provided as one or more examples. Other examples may differ from what is described with respect to FIG. 13.

Figure 14:
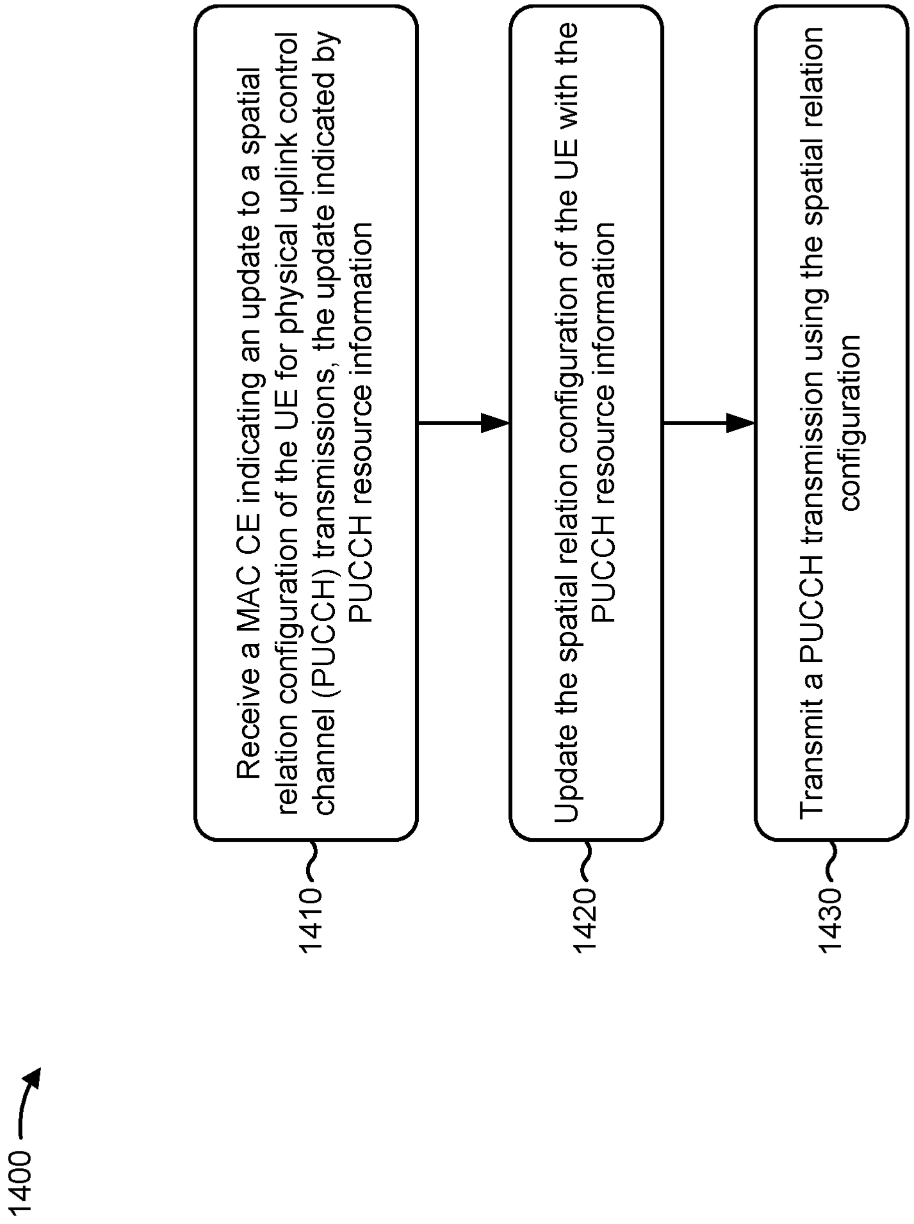
FIG. 14 illustrates an example process of updating a spatial relation configuration of a UE with an enhanced MAC CE for a PUCCH resource, for example, by a user equipment, in accordance with various aspects of the present disclosure.

FIG. 14 is a diagram illustrating an example process 1400 performed, for example, by a UE, in accordance with various aspects of the present disclosure. Example process 1400 is an example where a UE (e.g., UE 120 and/or the like) performs operations associated with updating, with a MAC CE, a spatial relation configuration of the UE for PUCCH transmissions.

As shown in FIG. 14, in some aspects, process 1400 may include receiving a MAC CE indicating an update to a spatial relation configuration of the UE for PUCCH transmissions, the update indicated by PUCCH resource information (block 1410). In some aspects, the PUCCH resource information includes a PUCCH resource identifier that identifies a PUCCH resource, and the PUCCH resource information includes identification information that identifies a particular spatial relation configuration of spatial settings and power control parameters for transmission on the PUCCH resource. For example, the UE (e.g., using receive processor 258, transmit processor 264, controller/processor 280, memory 282, and/or the like) may receive a MAC CE indicating an update to a spatial relation configuration of the UE for PUCCH transmissions, the update indicated by PUCCH resource information, as described above. In some aspects, the PUCCH resource information includes a PUCCH resource identifier that identifies a PUCCH resource, and the PUCCH resource information includes identification information that identifies a particular spatial relation configuration of spatial settings and power control parameters for transmission on the PUCCH resource.

As further shown in FIG. 14, in some aspects, process 1400 may include updating the spatial relation configuration of the UE with the PUCCH resource information (block 1420). For example, the UE (e.g., using receive processor 258, transmit processor 264, controller/processor 280, memory 282, and/or the like) may update the spatial relation configuration of the UE with the PUCCH resource information, as described above.

As further shown in FIG. 14, in some aspects, process 1400 may include transmitting a PUCCH transmission using the spatial relation configuration (block 1430). For example, the UE (e.g., using receive processor 258, transmit processor 264, controller/processor 280, memory 282, and/or the like) may transmit a PUCCH transmission using the spatial relation configuration, as described above.

Process 1400 may include additional aspects, such as any single aspect or any combination of aspects described below and/or in connection with one or more other processes described elsewhere herein.

In a first aspect, the identification information includes a spatial relation identifier that identifies the particular spatial relation configuration.

In a second aspect, alone or in combination with the first aspect, the PUCCH resource information includes a plurality of PUCCH resource identifiers and respective identification information for each of the plurality of PUCCH resource identifiers.

In a third aspect, alone or in combination with one or more of the first and second aspects, identification information for at least one of the plurality of PUCCH resource identifiers is different than identification information for another at least one of the plurality of PUCCH resource identifiers.

In a fourth aspect, alone or in combination with one or more of the first through third aspects, the PUCCH resource information includes a bit for each of the plurality of PUCCH resource identifiers that indicates whether identification information is present for a respective one of the plurality of PUCCH resource identifiers.

In a fifth aspect, alone or in combination with one or more of the first through fourth aspects, the identification information includes a bitmap of configurations of spatial settings and power control parameters for transmission on the PUCCH resource, the bitmap identifying the particular spatial relation configuration.

In a sixth aspect, alone or in combination with one or more of the first through fifth aspects, the update is an activation update to the spatial relation configuration.

In a seventh aspect, alone or in combination with one or more of the first through sixth aspects, the update is a deactivation update to the spatial relation configuration.

Although FIG. 14 shows example blocks of process 1400, in some aspects, process 1400 may include additional blocks, fewer blocks, different blocks, or differently arranged blocks than those depicted in FIG. 14. Additionally, or alternatively, two or more of the blocks of process 1400 may be performed in parallel.

Figure 15:
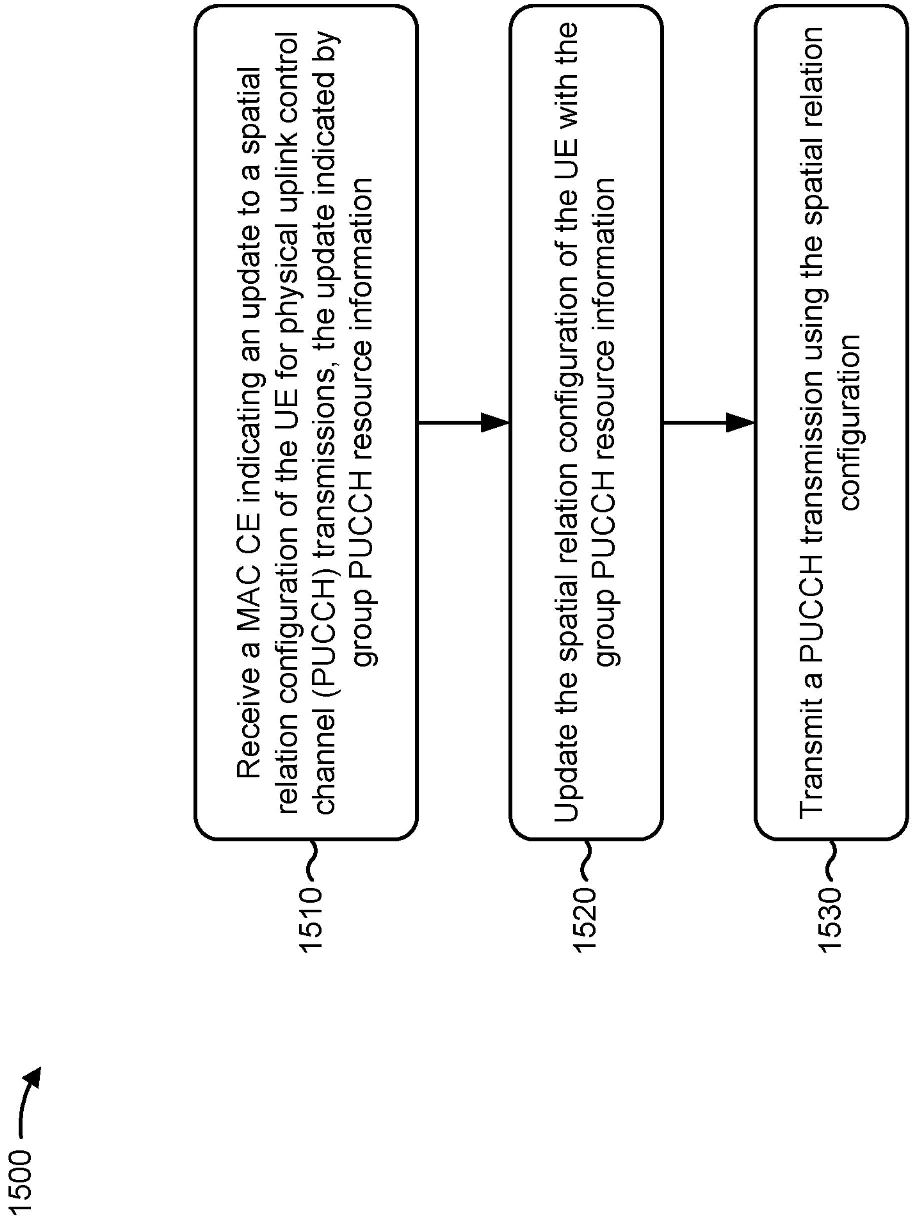
FIG. 15 illustrates an example process of updating a spatial relation configuration of a UE with an enhanced MAC CE for a PUCCH group of resources, for example, by a user equipment, in accordance with various aspects of the present disclosure.

FIG. 15 is a diagram illustrating an example process 1500 performed, for example, by a UE, in accordance with various aspects of the present disclosure. Example process 1500 is an example where a UE (e.g., UE 120 and/or the like) performs operations associated with updating, with a MAC CE, a spatial relation configuration of a UE for PUCCH transmissions.

As shown in FIG. 15, in some aspects, process 1500 may include receiving a MAC CE indicating an update to a spatial relation configuration of the UE for PUCCH transmissions, the update indicated by group PUCCH resource information (block 1510). In some aspects, the group PUCCH resource information identifies a plurality of PUCCH resources, and the group PUCCH resource information includes a particular spatial relation configuration of spatial settings and power control parameters for transmission on the plurality of PUCCH resources, the particular spatial relation configuration being applicable to each PUCCH resource of the plurality of PUCCH resources. For example, the UE (e.g., using receive processor 258, transmit processor 264, controller/processor 280, memory 282, and/or the like) may receive a MAC CE indicating an update to a spatial relation configuration of the UE for PUCCH transmissions, the update indicated by group PUCCH resource information, as described above. In some aspects, the group PUCCH resource information identifies a plurality of PUCCH resources, and the group PUCCH resource information includes a particular spatial relation configuration of spatial settings and power control parameters for transmission on the plurality of PUCCH resources, the particular spatial relation configuration being applicable to each PUCCH resource of the plurality of PUCCH resources. In some aspects, the group PUCCH resource information includes group identification information that identifies a plurality of PUCCH resources.

As further shown in FIG. 15, in some aspects, process 1500 may include updating the spatial relation configuration of the UE with the group PUCCH resource information (block 1520). For example, the UE (e.g., using receive processor 258, transmit processor 264, controller/processor 280, memory 282, and/or the like) may update the spatial relation configuration of the UE with the group PUCCH resource information, as described above.

As further shown in FIG. 15, in some aspects, process 1500 may include transmitting a PUCCH transmission using the spatial relation configuration (block 1530). For example, the UE (e.g., using receive processor 258, transmit processor 264, controller/processor 280, memory 282, and/or the like) may transmit a PUCCH transmission using the spatial relation configuration, as described above.

Process 1500 may include additional aspects, such as any single aspect or any combination of aspects described below and/or in connection with one or more other processes described elsewhere herein.

In a first aspect, the group identification information includes a PUCCH group identifier.

In a second aspect, alone or in combination with the first aspect, the PUCCH group identifier is 1 bits to 7 bits in the MAC CE.

In a third aspect, alone or in combination with one or more of the first and second aspects, the PUCCH group identifier and a spatial relation identifier, identifying the particular spatial relation configuration, are in a single octet of the MAC CE. In some aspects, the group PUCCH resource information identifies a plurality of PUCCH groups, where each PUCCH group corresponds to a respective spatial relation identifier.

In a fourth aspect, alone or in combination with one or more of the first through third aspects, the group PUCCH resource information includes a plurality of PUCCH group identifiers and a plurality of spatial relation identifiers, each PUCCH group identifier corresponding to a respective spatial relation identifier.

In a fifth aspect, alone or in combination with one or more of the first through fourth aspects, the group PUCCH resource information includes a bit that indicates whether group identification information is present for a next PUCCH group identifier in the MAC CE.

In a sixth aspect, alone or in combination with one or more of the first through fifth aspects, the group identification information includes a bitmap of PUCCH resources, the bitmap identifying the plurality of PUCCH resources.

In a seventh aspect, alone or in combination with one or more of the first through sixth aspects, the update is an activation update to the spatial relation configuration.

In an eighth aspect, alone or in combination with one or more of the first through seventh aspects, the update is a deactivation update to the spatial relation configuration.

Although FIG. 15 shows example blocks of process 1500, in some aspects, process 1500 may include additional blocks, fewer blocks, different blocks, or differently arranged blocks than those depicted in FIG. 15. Additionally, or alternatively, two or more of the blocks of process 1500 may be performed in parallel.

Figure 16:
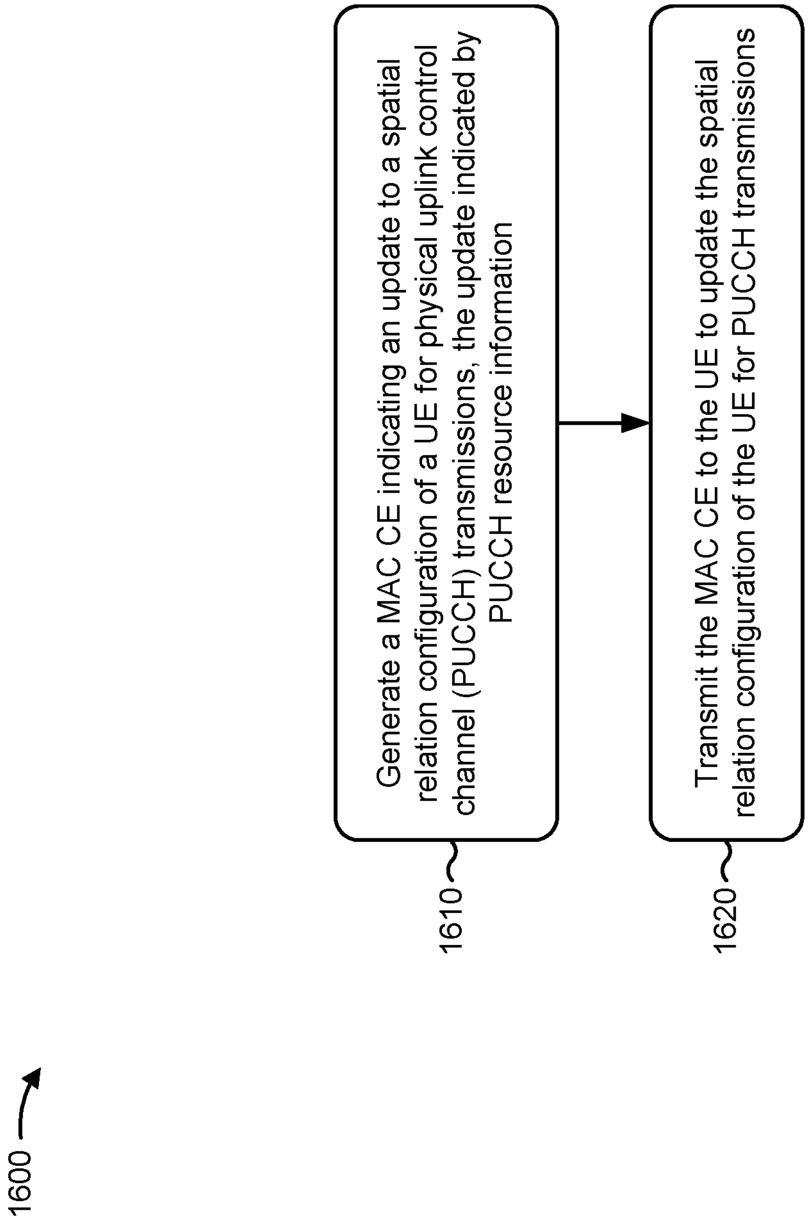
FIG. 16 illustrates an example process of updating a spatial relation configuration of a UE with an enhanced MAC CE for a PUCCH resource, for example, by a base station, in accordance with various aspects of the present disclosure.

FIG. 16 is a diagram illustrating an example process 1600 performed, for example, by a base station, in accordance with various aspects of the present disclosure. Example process 1600 is an example where a base station (e.g., base station 110 and/or the like) performs operations associated with a base station updating, with a MAC CE, a spatial relation configuration of a UE for PUCCH transmissions.

As shown in FIG. 16, in some aspects, process 1600 may include generating a MAC CE indicating an update to a spatial relation configuration of a UE for PUCCH transmissions, the update indicated by PUCCH resource information (block 1610). In some aspects, the PUCCH resource information includes a PUCCH resource identifier that identifies a PUCCH resource, and the PUCCH resource information includes identification information that identifies a particular spatial relation configuration of spatial settings and power control parameters for transmission on the PUCCH resource (block 1610). For example, the base station (e.g., using transmit processor 220, receive processor 238, controller/processor 240, memory 242, and/or the like) may generate a MAC CE indicating an update to a spatial relation configuration of a UE for PUCCH transmissions, the update indicated by PUCCH resource information, as described above. In some aspects, the PUCCH resource information includes a PUCCH resource identifier that identifies a PUCCH resource, and the PUCCH resource information includes identification information that identifies a particular spatial relation configuration of spatial settings and power control parameters for transmission on the PUCCH resource.

As further shown in FIG. 16, in some aspects, process 1600 may include transmitting the MAC CE to the UE to update the spatial relation configuration of the UE for PUCCH transmissions (block 1620). For example, the base station (e.g., using transmit processor 220, receive processor 238, controller/processor 240, memory 242, and/or the like) may transmit the MAC CE to the UE to update the spatial relation configuration of the UE for PUCCH transmissions, as described above.

Process 1600 may include additional aspects, such as any single aspect or any combination of aspects described below and/or in connection with one or more other processes described elsewhere herein.

In a first aspect, the identification information includes a spatial relation identifier that identifies the particular spatial relation configuration.

In a second aspect, alone or in combination with the first aspect, the PUCCH resource information includes a plurality of PUCCH resource identifiers and respective identification information for each of the plurality of PUCCH resource identifiers.

In a third aspect, alone or in combination with one or more of the first and second aspects, identification information for at least one of the plurality of PUCCH resource identifiers is different than identification information for another at least one of the plurality of PUCCH resource identifiers.

In a fourth aspect, alone or in combination with one or more of the first through third aspects, the PUCCH resource information includes a bit that indicates whether identification information is present for a next PUCCH resource identifier in the MAC CE.

In a fifth aspect, alone or in combination with one or more of the first through fourth aspects, the identification information includes a bitmap of configurations of spatial settings and power control parameters for transmission on the PUCCH resource, the bitmap identifying the particular spatial relation configuration.

In a sixth aspect, alone or in combination with one or more of the first through fifth aspects, the update is an activation update to the spatial relation configuration.

In a seventh aspect, alone or in combination with one or more of the first through sixth aspects, the update is a deactivation update to the spatial relation configuration.

Although FIG. 16 shows example blocks of process 1600, in some aspects, process 1600 may include additional blocks, fewer blocks, different blocks, or differently arranged blocks than those depicted in FIG. 16. Additionally, or alternatively, two or more of the blocks of process 1600 may be performed in parallel.

Figure 17:
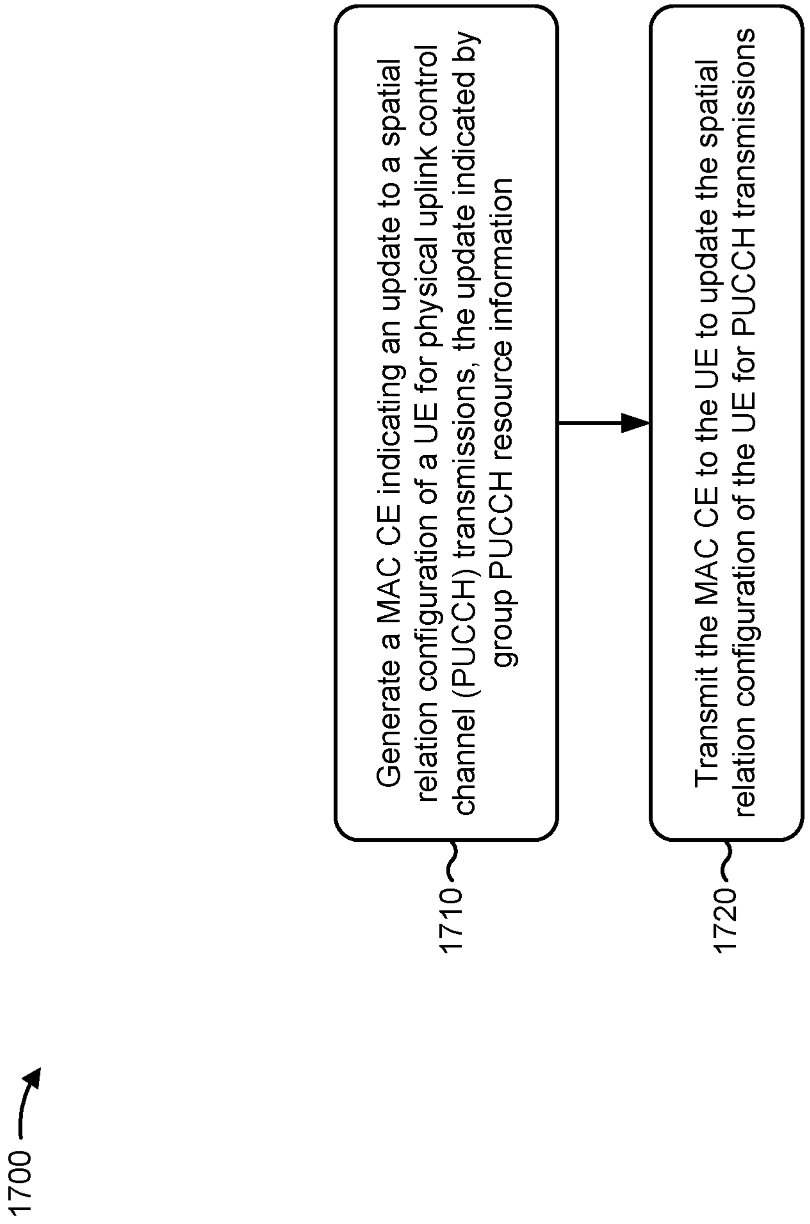
FIG. 17 illustrates an example process of updating a spatial relation configuration of a UE with an enhanced MAC CE for a PUCCH group of resources, for example, by a base station, in accordance with various aspects of the present disclosure.

FIG. 17 is a diagram illustrating an example process 1700 performed, for example, by a base station, in accordance with various aspects of the present disclosure. Example process 1700 is an example where a base station (e.g., base station 110 and/or the like) performs operations associated with a base station updating, with a MAC CE, a spatial relation configuration of a UE for PUCCH transmissions.

As shown in FIG. 17, in some aspects, process 1700 may include generating a MAC CE indicating an update to a spatial relation configuration of a UE for PUCCH transmissions, the update indicated by group PUCCH resource information (block 1710). In some aspects, the group PUCCH resource information identifies a plurality of PUCCH resources, and the group PUCCH resource information includes a particular spatial relation configuration of spatial settings and power control parameters for transmission on the plurality of PUCCH resources, the particular spatial relation configuration being applicable to each PUCCH resource of the plurality of PUCCH resources. For example, the base station (e.g., using transmit processor 220, receive processor 238, controller/processor 240, memory 242, and/or the like) may generate a MAC CE indicating an update to a spatial relation configuration of a UE for PUCCH transmissions, the update indicated by group PUCCH resource information, as described above. The group PUCCH resource information identifies a plurality of PUCCH resources, and the group PUCCH resource information includes a particular spatial relation configuration of spatial settings and power control parameters for transmission on the plurality of PUCCH resources, the particular spatial relation configuration being applicable to each PUCCH resource of the plurality of PUCCH resources.

As further shown in FIG. 17, in some aspects, process 1700 may include transmitting the MAC CE to the UE to update the spatial relation configuration of the UE for PUCCH transmissions (block 1720). For example, the base station (e.g., using transmit processor 220, receive processor 238, controller/processor 240, memory 242, and/or the like) may transmit the MAC CE to the UE to update the spatial relation configuration of the UE for PUCCH transmissions, as described above.

Process 1700 may include additional aspects, such as any single aspect or any combination of aspects described below and/or in connection with one or more other processes described elsewhere herein.

In a first aspect, the group identification information includes a PUCCH group identifier.

In a second aspect, alone or in combination with the first aspect, the PUCCH group identifier is 1 bits to 7 bits in the MAC CE.

In a third aspect, alone or in combination with one or more of the first and second aspects, the PUCCH group identifier and a spatial relation identifier, identifying the particular spatial relation configuration, are in a single octet of the MAC CE.

In a fourth aspect, alone or in combination with one or more of the first through third aspects, the group PUCCH resource information includes a plurality of PUCCH group identifiers and a plurality of spatial relation identifiers, each PUCCH group identifier corresponding to a respective spatial relation identifier.

In a fifth aspect, alone or in combination with one or more of the first through fourth aspects, the group PUCCH resource information includes a bit that indicates whether group identification information is present for a next PUCCH group identifier in the MAC CE.

In a sixth aspect, alone or in combination with one or more of the first through fifth aspects, the group identification information includes a bitmap of PUCCH resources, the bitmap identifying the plurality of PUCCH resources.

In a seventh aspect, alone or in combination with one or more of the first through sixth aspects, the update is an activation update to the spatial relation configuration.

In an eighth aspect, alone or in combination with one or more of the first through seventh aspects, the update is a deactivation update to the spatial relation configuration.

Although FIG. 17 shows example blocks of process 1700, in some aspects, process 1700 may include additional blocks, fewer blocks, different blocks, or differently arranged blocks than those depicted in FIG. 17. Additionally, or alternatively, two or more of the blocks of process 1700 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term “component” is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:

receiving a medium access control (MAC) command element (CE) indicating an update to a spatial relation configuration of the UE for physical uplink control channel (PUCCH) transmissions, the update indicated by PUCCH resource information that includes:

a PUCCH resource identifier that identifies a PUCCH resource, and a bitmap including a plurality of candidate spatial relation configurations, wherein the bitmap identifies a value corresponding to a particular spatial relation configuration of the plurality of candidate spatial relation configurations, and wherein the particular spatial relation configuration includes spatial settings and power control parameters for transmission on the PUCCH resource;

updating the spatial relation configuration of the UE in accordance with the PUCCH resource information; and transmitting a PUCCH transmission using the spatial relation configuration; and wherein:

the bitmap includes a first bit corresponding to the particular spatial relation configuration, the first bit is set to a first value, the bitmap includes a plurality of second bits corresponding to other candidate spatial relation configurations of the plurality of candidate spatial relation configurations, and the plurality of second bits are set to a second value different from the first value.

2. The method of claim 1, wherein the value corresponds to a spatial relation identifier that identifies the particular spatial relation configuration.

3. The method of claim 1, wherein the PUCCH resource information includes a plurality of PUCCH resource identifiers and respective identification information for each of the plurality of PUCCH resource identifiers.

4. The method of claim 3, wherein identification information for at least one of the plurality of PUCCH resource identifiers is different than identification information for another at least one of the plurality of PUCCH resource identifiers.

5. The method of claim 1, wherein the update is an activation update to the spatial relation configuration.

6. The method of claim 1, wherein the update is a deactivation update to the spatial relation configuration.

7. A method of wireless communication performed by a user equipment (UE), comprising:

receiving a medium access control (MAC) command element (CE) indicating an update to a spatial relation configuration of the UE for physical uplink control channel (PUCCH) transmissions, the update indicated by group PUCCH resource information that includes:

a plurality of PUCCH resources, and a plurality of bitmaps, each bitmap including a respective plurality of candidate spatial relation configurations, wherein each bitmap identifies a respective value corresponding to a particular spatial relation configuration of the respective plurality of candidate spatial relation configurations, and wherein the particular spatial relation configuration includes spatial settings and power control parameters for transmission on a respective PUCCH resource of the plurality of PUCCH resources;

updating the spatial relation configuration of the UE in accordance with the group PUCCH resource information; and transmitting a PUCCH transmission using the spatial relation configuration; and wherein:

each bitmap includes a first bit corresponding to the particular spatial relation configuration, the first bit is set to a first value, the bitmap includes a plurality of second bits corresponding to other candidate spatial relation configurations of the respective plurality of candidate spatial relation configurations, and the plurality of second bits are set to a second value different from the first value.

8. The method of claim 7, wherein the group PUCCH resource information identifies a plurality of PUCCH groups and a plurality of spatial relation identifiers, each PUCCH group corresponding to a respective spatial relation identifier.

9. The method of claim 7, wherein the update is an activation update to the spatial relation configuration.

10. The method of claim 7, wherein the update is a deactivation update to the spatial relation configuration.

11. A method of wireless communication performed by a base station, comprising:

generating a medium access control (MAC) command element (CE) indicating an update to a spatial relation configuration of a user equipment (UE) for physical uplink control channel (PUCCH) transmissions, the update indicated by PUCCH resource information that includes:

a PUCCH resource identifier that identifies a PUCCH resource, and a bitmap including a plurality of candidate spatial relation configurations, wherein the bitmap identifies a value corresponding to a particular spatial relation configuration of the plurality of candidate spatial relation configurations, and wherein the particular spatial relation configuration includes spatial settings and power control parameters for transmission on the PUCCH resource; and transmitting the MAC CE to the UE to update the spatial relation configuration of the UE for PUCCH transmissions; and wherein:

the bitmap includes a first bit corresponding to the particular spatial relation configuration, the first bit is set to a first value, the bitmap includes a plurality of second bits corresponding to other candidate spatial relation configurations of the plurality of candidate spatial relation configurations, and the plurality of second bits are set to a second value different from the first value.

12. The method of claim 11, wherein the value corresponds to a spatial relation identifier that identifies the particular spatial relation configuration.

13. The method of claim 11, wherein the PUCCH resource information includes a plurality of PUCCH resource identifiers and respective identification information for each of the plurality of PUCCH resource identifiers.

14. The method of claim 13, wherein identification information for at least one of the plurality of PUCCH resource identifiers is different than identification information for another at least one of the plurality of PUCCH resource identifiers.

15. The method of claim 13, wherein the PUCCH resource information includes a bit that indicates whether identification information is present for a next PUCCH resource identifier in the MAC CE.

16. The method of claim 11, wherein the update is an activation update to the spatial relation configuration.

17. The method of claim 11, wherein the update is a deactivation update to the spatial relation configuration.

18. A user equipment (UE) for wireless communication, comprising:

memory; and one or more processors operatively coupled to the memory, the one or more processors configured to:

receive a medium access control (MAC) command element (CE) indicating an update to a spatial relation configuration of the UE for physical uplink control channel (PUCCH) transmissions, the update indicated by PUCCH resource information that includes:

a PUCCH resource identifier that identifies a PUCCH resource, and a bitmap including a plurality of candidate spatial relation configurations, wherein the bitmap identifies a value corresponding to a particular spatial relation configuration of the plurality of candidate spatial relation configurations, and wherein the particular spatial relation configuration includes spatial settings and power control parameters for transmission on the PUCCH resource;

update the spatial relation configuration of the UE in accordance with the PUCCH resource information; and transmit a PUCCH transmission using the spatial relation configuration; and wherein:

the bitmap includes a first bit corresponding to the particular spatial relation configuration, the first bit is set to a first value, the bitmap includes a plurality of second bits corresponding to other candidate spatial relation configurations of the plurality of candidate spatial relation configurations, and the plurality of second bits are set to a second value different from the first value.

19. The UE of claim 18, wherein the value corresponds to a spatial relation identifier that identifies the particular spatial relation configuration.

20. The UE of claim 18, wherein the PUCCH resource information includes a plurality of PUCCH resource identifiers and respective identification information for each of the plurality of PUCCH resource identifiers.

21. The UE of claim 20, wherein identification information for at least one of the plurality of PUCCH resource identifiers is different than identification information for another at least one of the plurality of PUCCH resource identifiers.

22. The UE of claim 18, wherein the update is an activation update to the spatial relation configuration.

23. The UE of claim 18, wherein the update is a deactivation update to the spatial relation configuration.

* * * * *